United States Patent
Chen et al.

(10) Patent No.: US 12,452,009 B2
(45) Date of Patent: *Oct. 21, 2025

(54) METHOD, DEVICE, AND STORAGE MEDIUM FOR CONFIGURING STARTING SYMBOL POSITION OF UPLINK DATA CHANNEL

(71) Applicant: ZTE CORPORATION, Guangdong (CN)

(72) Inventors: Yijian Chen, Shenzhen (CN); Zhaohua Lu, Shenzhen (CN); Chuangxin Jiang, Shenzhen (CN); YuNgok Li, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,811

(22) Filed: May 1, 2024

(65) Prior Publication Data

US 2024/0364467 A1 Oct. 31, 2024

Related U.S. Application Data

(63) Continuation of application No. 17/954,408, filed on Sep. 28, 2022, now Pat. No. 12,034,658, which is a (Continued)

(30) Foreign Application Priority Data

Jun. 20, 2017 (CN) .......................... 201710472004.3

(51) Int. Cl.
*H04L 5/00* (2006.01)
*H04W 72/0446* (2023.01)
*H04W 72/23* (2023.01)

(52) U.S. Cl.
CPC ....... *H04L 5/0044* (2013.01); *H04W 72/0446* (2013.01); *H04W 72/23* (2023.01)

(58) Field of Classification Search
CPC ...... H04L 5/0044; H04L 5/044; H04W 72/23; H04W 72/231; H04W 72/232; H04W 72/0446
See application file for complete search history.

(56) References Cited

U.S. PATENT DOCUMENTS 11,582,779 B2 * 2/2023 Chen .................. H04W 72/0446
12,034,658 B2 * 7/2024 Chen ...................... H04L 5/0057
(Continued)

FOREIGN PATENT DOCUMENTS

| CA | 2997429 A1 | 3/2017 |
| CN | 101997663 A | 3/2011 |

(Continued)

OTHER PUBLICATIONS

AT&T, "Transmission duration indication for symbol-level/slot-level/multi-slot-level scheduling", 3GPP TSG RAN WG1 NR Ad-Hoc#2, R1-1710414, Jun. 30, 2017, Qingdao, P.R. China (5 pages).

(Continued)

*Primary Examiner* — Kevin C. Harper
(74) *Attorney, Agent, or Firm* — Foley & Lardner LLP

(57) ABSTRACT

Provided are a method, device and storage medium for configuring a starting symbol position of an uplink data channel. The method includes: determining a configuration value of a first type parameter set, where the first type parameter set is a set of uplink data parameters; determining a configuration range of a starting symbol position of an uplink data channel according to the configuration value of the first type parameter set; and selecting a starting symbol position of the uplink data channel from the configuration range of the starting symbol position of the uplink data (Continued)

channel, and notifying a receiving end of the selected starting symbol position of the uplink data channel.

12 Claims, 17 Drawing Sheets

Related U.S. Application Data continuation of application No. 16/718,699, filed on Dec. 18, 2019, now Pat. No. 11,582,779, which is a continuation of application No. PCT/CN2018/090602, filed on Jun. 11, 2018.

(56) References Cited

U.S. PATENT DOCUMENTS

| | | | |
|---|---|---|---|
| 2016/0352551 | A1 | 12/2016 | Zhang et al. |
| 2017/0019232 | A1 | 1/2017 | Seo et al. |
| 2017/0289966 | A1 | 10/2017 | Islam et al. |
| 2017/0359808 | A1 | 12/2017 | Dinan |
| 2017/0374653 | A1 | 12/2017 | Lee et al. |
| 2018/0132229 | A1* | 5/2018 | Li ........................ H04L 5/0053 |
| 2018/0167936 | A1 | 6/2018 | Quan et al. |
| 2019/0215831 | A1 | 7/2019 | Baldemair et al. |
| 2019/0394792 | A1 | 12/2019 | Jeon et al. |
| 2020/0077433 | A1 | 3/2020 | Lin et al. |

FOREIGN PATENT DOCUMENTS

| | | |
|---|---|---|
| CN | 103716116 A | 4/2014 |
| CN | 104685802 A | 6/2015 |
| CN | 104704755 A | 6/2015 |
| CN | 106559879 A | 4/2017 |
| CN | 108112078 A | 6/2018 |
| EP | 3 324 693 A1 | 5/2018 |
| RU | 2581037 C2 | 4/2016 |
| RU | 2622396 C2 | 6/2017 |
| WO | WO-2014/187260 A1 | 11/2014 |
| WO | WO-2015/163642 A1 | 10/2015 |
| WO | WO-2017/024564 A1 | 2/2017 |
| WO | WO-2017/069848 A1 | 4/2017 |
| WO | WO-2017/076280 A1 | 5/2017 |
| WO | WO-2017/076281 A1 | 5/2017 |

OTHER PUBLICATIONS

Communication pursuant to Article 94(3) EPC on EP appl. No. 18820058.8, dated Mar. 2, 2023 (6 pages).
Decision on Grant for RU Appl. No. 2020101657, dated Jun. 19, 2020 (with English translation, 18 pages).
Ericsson, "On UE processing time and scheduling complexity", 3GPP TSG RAN WG1 NR Ad-Hoc #2, R1-1711367, Qingdao, P.R. China, Jun. 27-30, 2017 (2 pages).
Extended European Search Report for EP Appl. No. 18820058.8, dated Feb. 17, 2021 (9 pages).
First IN Exam Report on IN Patent Application No. 202037002020 dated Mar. 12, 2021 (6 pages).
First JP Office Action on JP Patent Application No. 2019-571024, mailed Mar. 25, 2021 (6 pages, including English translation).
First Office Action for CN Appl. No. 201710472004.3, dated Mar. 3, 2022 (with English translation, 10 pages).
First Office Action for JP Appl. No. 2022-026584, dated Dec. 21, 2022 (with English translation, 6 pages).
Guangdong Oppo Mobile Telecom, "Time-domain resource allocation for NR", 3GPP TSG RAN WG1 NR Ad-Hoc#2, R1-1710165, Jun. 30, 2017, Qingdao, P.R. China (8 pages).
Huawei et al., "Discussion on data transmission duration", 3GPP TSG RAN WG1 NR Ad Hoc Meeting, R1-1709994, Jun. 30, 2017, Qingdao, China (8 pages).
Huawei et al., "WF on UE Processing Time" 3GPP TSG RAN WG1 Meeting #89; R1-1709702; May 19, 2017; Hangzhou, China (5 pages).
Huawei et al.: "HARQ feedback timing for NR" 3GPP TSG RAN WG1 NR Ad Hoc Meeting; R1-1709970; Jun. 30, 2017 (4 pages).
Intel Corporation, "Time-domain resource allocation for DL and UL data", 3GPP TSG-RAN WG1 adhoc_NR_AH_1706 R1-1710566, Qingdao, China, Jun. 27-30, 2017 (6 pages).
International Search Report and Written Opinion of the International Searching Authority on PCT/CN2018/090602 mailed on Aug. 15, 2018 (10 pages).
Mediatek Inc., "The starting and ending position in time domain of PUSCH" 3GPP TSG RAN WG1 Meeting #89, R1-1707844, May 19, 2017, Hangzhou, P.R. China (4 pages).
Nokia et al., "On PUSCH resource allocation and scheduling timing in NR", 3GPP TSG RAN WG1 #89, R1-1708523, May 19, 2017, Hangzhou, P.R. China (8 pages).
Nokia et al.: "Time-domain resource allocation for NR" 3GPP TSG RAN WG1 NR Ad-Hoc #2; R1-1710990; Jun. 30, 2017; Qingdao, P.R. China (8 pages).
Non-Final Office Action on U.S. Appl. No. 17/954,408 Dtd Aug. 3, 2023.
Notice of Allowance for JP Appl. No. 2022-026584, dated Jun. 2, 2024 (with English translation, 6 pages).
Notice of Allowance on U.S. Appl. No. 17/954,408 Dtd jan. 31, 2024.
Notification to Grant Patent Right for Invention for CN Appl. No. 201710472004.3, dated Jun. 27, 2023 (with English translation, 6 pages).
Office Action for KR Appl. No. 10-2020-7001873, dated Apr. 24, 2024 (with English translation, 9 pages).
Pre-Appeal Examination Report issued for the JP Patent Application No. 2019-571024, mailed on Apr. 26, 2022 (10 pages, including English translation).
Samsung, "DL/UL Time Resource Allocation", 3GPP TSG RAN WG1 NR Ad-Hoc#2, R1-1710719, Jun. 30, 2017, Qingdao, P.R. China (4 pages).
Samsung, "Multiple starting and ending positions for UL" 3GPP TSG RAN WG1 Meeting #89, R1-1707904, May 19, 2017, Hangzhou, China (3 pages).
Samsung, "Multiple starting and ending positions for UL", 3GPP TSG-RAN WG1 Meeting #89, R1-1707904, Hangzhou, China, May 15-19, 2917 (3 pages).
Samsung, "Remaining Aspects for Short Scheduling Durations", 3GPP TSG RAN WG1 NR Ad- Hoc#2, R1-1710735, Jun. 30, 2017, Qingdao, P.R. China (3 pages).
Samsung, "Scheduling Timing for UL Data Channels" 3GPP TSG RAN WG1 Meeting #89, R1-1708022, May 19, 2017, Hangzhou, P.R. China (3 pages).
Second Office Action for CN Appl. No. 201710472004.3, dated Nov. 11, 2022 (with English translation, 4 pages).
Third Office Action for CN Appl. No. 201710472004.3, dated Mar. 24, 2023 (with English translation, 4 pages).
US Notice of Allowance on U.S. Appl. No. 16/718,699 Dtd Jan. 20, 2022.
US Office Action on U.S. Appl. No. 16/718,699 Dtd May 25, 2021.
VIVO, "Discussion on NR UE supporting self-contained operation", 3GPP TSG RAN WG1 AH_NR Meeting, R1-1710394, Jun. 30, 2017, Qingdao, P.R. China (3 pages).

\* cited by examiner

METHOD, DEVICE, AND STORAGE MEDIUM FOR CONFIGURING STARTING SYMBOL POSITION OF UPLINK DATA CHANNEL

CROSS-REFERENCES TO RELATED APPLICATIONS

This application is a continuation of U.S. patent application Ser. No. 17/954,408, filed Sep. 28, 2022 which claims the benefit of priority under 35 U.S.C. § 120 as a continuation of U.S. patent application Ser. No. 16/718,699, filed Dec. 18, 2019, which is continuation of PCT Patent Application No. PCT/CN2018/090602, filed on Jun. 11, 2018, which claims priority to Chinese patent application No. 201710472004.3, filed on Jun. 20, 2017, the disclosure of each of which is incorporated herein by reference in its entirety.

TECHNICAL FIELD

Embodiments of the present disclosure relate to, but are not limited to, communications and, in particular, to a method, device, and storage medium for configuring a starting symbol position of an uplink data channel.

BACKGROUND

In a wireless communication system, a terminal needs to process various types of tasks on a baseband. These tasks mainly include the following types.

Sending preparation of uplink (UL) data: a terminal receives physical downlink control information (DCI) sent by a base station, and needs to complete baseband processing tasks, such as data coding and modulation and data precoding, within limited time.

Demodulation and reception of downlink (DL) data: a terminal receives DL data sent by a base station, needs to complete estimation, demodulation and coding of a demodulation reference signal (DMRS) within limited time, and determines whether a code block is received correctly, so as to feed an acknowledgement/negative acknowledgement (ACK/NACK) response back timely at a limited position.

Measurement feedback of channel state information (CSI): DL measurement feedback needs to perform estimation according to a measurement reference signal configured in the CSI process, then performs CSI quantization according to a measured channel, and completes CSI quantization calculation and UL CSI reporting within limited time, where the CSI includes a rank indicator (RI), a precoder matrix indicator (PMI), a channel quality indicator (CQI), CSI-reference signal (RS) response indicator/index (CRI) and the like.

Measurement feedback of beam sate information (BSI): DL BSI feedback needs to perform estimation according to a reference signal configured in the BSI process, then performs beam quality calculation and beam selection, and completes BSI feedback within limited time, where the BSI includes a beam index, a reference signal resource index, reference signal receive power (RSRP) and the like.

It is to be noted that the above CSI and the BSI both can be understood as generalized CSI, and can be combined when described, that is, the BSI is understood as a kind of CSI.

In the related art, processing time left for the terminal is relatively fixed and not flexible. The terminal needs to face various processing tasks with different difficulties, and in some cases, the complexity is high while in other cases, the complexity is low. The high complexity will cause a problem of insufficient processing time left for the terminal.

SUMMARY

In view of this, embodiments of the present disclosure are to provide a method, device, and storage medium for configuring a starting symbol position of an uplink data channel to at least solve the problem in the related art of high cost and time inflexibility when a terminal processes a service.

The embodiments of the present disclosure provide a method for configuring a starting symbol position of an uplink data channel. The method includes: determining a configuration value of a first type parameter set, where the first type parameter set is a set of uplink data parameters; determining a configuration range of the starting symbol position of the uplink data channel according to the configuration value of the first type parameter set; and selecting the starting symbol position of the uplink data channel from the configuration range of the starting symbol position of the uplink data channel, and notifying a receiving end of the selected starting symbol position of the uplink data channel.

The embodiments of the present disclosure further provide a method for configuring an uplink parameter. The method includes: determining a starting symbol position of an uplink data channel; determining a configuration range of a first type parameter set according to the starting symbol position of the uplink data channel, where the first type parameter set is a set of uplink data parameters; and selecting a configuration of the first type parameter set from the configuration range of the first type parameter set, and notifying a receiving end of the configuration of the first type parameter set.

The embodiments of the present disclosure further provide a method for configuring a position parameter. The method includes: determining a configuration value of a second type parameter set, where the second type parameter set is a set of downlink data parameters; and determining a configuration range of an ending symbol position of a downlink data channel and/or a configuration range of a time domain sending symbol position of uplink response information according to the configuration value of the second type parameter set.

The embodiments of the present disclosure further provide a method for configuring a downlink parameter. The method includes: determining an ending symbol position of a downlink data channel; determining a configuration range of a second type parameter set according to the ending symbol position of the downlink data channel, where the second type parameter set is a set of downlink data parameters; and selecting a configuration of the second type parameter set in the configuration range of the second type parameter set, and notifying a receiving end of the configuration of the second type parameter set.

The embodiments of the present disclosure further provide a method for determining a transmission position of channel state information (CSI). The method includes: determining a configuration value of a third type parameter set, where the configuration value of the third type parameter set is a set of parameters of CSI; and determining a transmission position and/or a slot position of a time domain sending symbol of uplink report CSI according to the configuration value of the third type parameter set.

The embodiments of the present disclosure further provide a method for configuring CSI. The method includes: determining a reporting time domain position of CSI; determining a configuration range of a third type parameter set according to the reporting time domain position of the CSI, where a configuration value of the third type parameter set is a set of parameters of the CSI; and selecting a configuration of the third type parameter set from the configuration range of the third type parameter set, and notifying a receiving end of the determined configuration of the third type parameter set.

The embodiments of the present disclosure further provide a method for feeding back a time parameter. The method includes: determining $N_1$ value sets configured for a first type parameter set, where $N_1$ is an integer greater than or equal to 1, and a value of $N_1$ is agreed by a receiving end and a sending end or is determined according to signaling configured by a base station; determining a demand of uplink data sending preparation time corresponding to the $N_1$ value sets; and feeding back indication information of the demand of the uplink data sending preparation time corresponding to the $N_1$ value sets.

The embodiments of the present disclosure further provide a method for feeding back configuration restriction information. The method includes: determining $M_1$ values of uplink data sending preparation time, where $M_1$ is an integer greater than or equal to 1, and a value of $M_1$ is agreed by a receiving end and a sending end or is determined according to signaling configured by a base station; determining a restriction configuration range of a first type parameter set corresponding to the $M_1$ values of the uplink data sending preparation time, where the first type parameter set is a set of uplink data parameters; and feeding back indication information of the restriction configuration range of the first type parameter set corresponding to the $M_1$ values of the uplink data sending preparation time.

The embodiments of the present disclosure further provide a method for feeding back a time parameter. The method includes: determining $N_2$ value sets configured for a second type parameter set, where $N_2$ is an integer greater than or equal to 1, and a value of $N_2$ is agreed by a receiving end and a sending end or is determined according to signaling configured by a base station; determining a demand of downlink data processing time corresponding to the $N_2$ value sets; and feeding back indication information of the demand of the downlink data processing time corresponding to the $N_2$ value sets.

The embodiments of the present disclosure further provide a method for feeding back configuration restriction information. The method includes: determining $M_2$ values of downlink data processing time, where $M_2$ is an integer greater than or equal to 1, and a value of $M_2$ is agreed by a receiving end and a sending end or is determined according to signaling configured by a base station; determining a restriction configuration range of a second type parameter set corresponding to the $M_2$ values of the downlink data processing time, where the second type parameter set is a set of downlink data parameters; and feeding back indication information of the restriction configuration range of the second type parameter set corresponding to the $M_2$ values of the downlink data processing time.

The embodiments of the present disclosure further provide a method for feeding back a time parameter. The method includes: determining $N_3$ value sets configured for a third type parameter set, where $N_3$ is an integer greater than or equal to 1, a value of $N_3$ is agreed by a receiving end and a sending end or is determined according to signaling configured by a base station, and the third type parameter set is a set of parameters of CSI; determining a demand of CSI calculation processing time corresponding to the $N_3$ value sets; and feeding back indication information of the demand of the CSI calculation processing time corresponding to the $N_3$ value sets.

The embodiments of the present disclosure further provide a method for feeding back configuration restriction information. The method includes: determining $M_3$ values of CSI calculation time, where $M_3$ is an integer greater than or equal to 1, and a value of $M_3$ is agreed by a receiving end and a sending end or is determined according to signaling configured by a base station; determining a restriction configuration range of a third type parameter set corresponding to the $M_3$ values of the CSI calculation time; and feeding back indication information of the restriction configuration range of the third type parameter set corresponding to the $M_3$ values of the CSI calculation time.

The embodiments of the present disclosure further provide a method for processing a transmission parameter. The method includes: determining a configuration of a transmission parameter set of a data channel; determining a transmission configuration of a response message according to the configuration of the transmission parameter set of the data channel, where the transmission configuration of the response message includes: a transmission position of the response message, and a type of a channel carrying the response message; and sending or receiving data according to the transmission configuration of the response message.

The embodiments of the present disclosure provide a device for configuring a starting symbol position of an uplink data channel. The device includes: a first determining module, which is configured to determine a configuration value of a first type parameter set, where the first type parameter set is a set of uplink data parameters; a second determining module, which is configured to determine a configuration range of the starting symbol position of the uplink data channel according to the configuration value of the first type parameter set; and a first processing module, which is configured to select the starting symbol position of the uplink data channel from the configuration range of the starting symbol position of the uplink data channel, and notify a receiving end of the selected starting symbol position of the uplink data channel.

The embodiments of the present disclosure further provide a device for configuring an uplink parameter. The device includes: a third determining module, which is configured to determine a starting symbol position of an uplink data channel; a fourth determining module, which is configured to determine a configuration range of a first type parameter set according to the starting symbol position of the uplink data channel, where the first type parameter set is a set of uplink data parameters; and a second processing module, which is configured to select a configuration of the first type parameter set in the configuration range of the first type parameter set, and notify a receiving end of the configuration of the first type parameter set.

The embodiments of the present disclosure further provide a device for configuring a position parameter. The device includes: a fourth determining module, which is configured to determine a configuration value of a second type parameter set, where the second type parameter set is a set of downlink data parameters; and a fifth determining module, which is configured to determine a configuration range of an ending symbol position of a downlink data channel and/or a configuration range of a time domain sending symbol position of uplink response information according to the configuration value of the second type parameter set.

The embodiments of the present disclosure further provide a device for configuring a downlink parameter. The device includes: a sixth determining module, which is configured to determine an ending symbol position of a downlink data channel; a seventh determining module, which is configured to determine a configuration range of a second type parameter set according to the ending symbol position of the downlink data channel, where the second type parameter set is a set of downlink data parameters; and a fourth processing module, which is configured to select a configuration of the second type parameter set from the configuration range of the second type parameter set, and notify a receiving end of the configuration of the second type parameter set.

The embodiments of the present disclosure further provide a device for determining a transmission position of CSI. The device includes: an eighth determining module, which is configured to determine a configuration value of a third type parameter set, where the configuration value of the third type parameter set is a set of parameters of CSI; and a ninth determining module, which is configured to determine a transmission position and/or a slot position of a time domain sending symbol of uplink report CSI according to the configuration value of the third type parameter set.

The embodiments of the present disclosure further provide a device for configuring CSI. The device includes: a ninth determining module, which is configured to determine a reporting time domain position of CSI; a tenth determining module, which is configured to determine a configuration range of a third type parameter set according to the reporting time domain position of the CSI, where a configuration value of the third type parameter set is a set of parameters of the CSI; and a fifth processing module, which is configured to select a configuration of the third type parameter set in the configuration range of the third type parameter set, and notify a receiving end of the determined configuration of the third type parameter set.

The embodiments of the present disclosure further provide a device for feeding back a time parameter. The device includes: an eleventh determining module, which is configured to determine $N_1$ value sets configured for a first type parameter set, where $N_1$ is an integer greater than or equal to 1, and a value of $N_1$ is agreed by a receiving end and a sending end or is determined according to signaling configured by a base station; a twelfth determining module, which is configured to determine a demand of uplink data sending preparation time corresponding to the $N_1$ value sets; and a first feedback module, which is configured to feed back indication information of the demand of the uplink data sending preparation time corresponding to the $N_1$ value sets.

The embodiments of the present disclosure further provide a device for feeding back configuration restriction information. The device includes: a thirteenth determining module, which is configured to determine $M_1$ values of uplink data sending preparation time, where $M_1$ is an integer greater than or equal to 1, and a value of $M_1$ is agreed by a receiving end and a sending end or is determined according to signaling configured by a base station; a fourteenth determining module, which is configured to determine a restriction configuration range of a first type parameter set corresponding to the $M_1$ values of the uplink data sending preparation time, where the first type parameter set is a set of uplink data parameters; and a second feedback module, which is configured to feed back indication information of the restriction configuration range of the first type parameter set corresponding to the $M_1$ values of the uplink data sending preparation time.

The embodiments of the present disclosure further provide a device for feeding back a time parameter. The device includes: a fifteenth determining module, which is configured to determine $N_2$ value sets configured for a second type parameter set, where $N_2$ is an integer greater than or equal to 1, a value of $N_2$ is agreed by a receiving end and a sending end or is determined according to signaling configured by a base station, and the second type parameter set is a set of downlink data parameters; a sixteenth determining module, which is configured to determine a demand of downlink data processing time corresponding to the $N_2$ value sets; and a third feedback module, which is configured to feed back indication information of the demand of the downlink data processing time corresponding to the $N_2$ value sets.

The embodiments of the present disclosure further provide a device for feeding back configuration restriction information. The device includes: a seventeenth determining module, which is configured to determine $M_2$ values of downlink data processing time, where $M_2$ is an integer greater than or equal to 1, and a value of $M_2$ is agreed by a receiving end and a sending end or is determined according to signaling configured by a base station; an eighteenth determining module, which is configured to determine a restriction configuration range of a second type parameter set corresponding to the $M_2$ values of the downlink data processing time, where the second type parameter set is a set of downlink data parameters; and a fourth feedback module, which is configured to feed back indication information of the restriction configuration range of the second type parameter set corresponding to the $M_2$ values of the downlink data processing time.

The embodiments of the present disclosure further provide a device for feeding back a time parameter. The device includes: a nineteenth determining module, which is configured to determine $N_3$ value sets configured for a third type parameter set, where $N_3$ is an integer greater than or equal to 1, a value of $N_3$ is agreed by a receiving end and a sending end or is determined according to signaling configured by a base station, and the third type parameter set is a set of parameters of CSI; a twentieth determining module, which is configured to determine a demand of CSI calculation processing time corresponding to the $N_3$ value sets; and a fifth feedback module, which is configured to feed back indication information of the demand of the CSI calculation processing time corresponding to the $N_3$ value sets.

The embodiments of the present disclosure further provide a device for feeding back configuration restriction information. The device includes: a twenty-first determining module, which is configured to determine $M_3$ values of CSI calculation time, where $M_3$ is an integer greater than or equal to 1, and a value of $M_3$ is agreed by a receiving end and a sending end or is determined according to signaling configured by a base station; a twenty-second determining module, which is configured to determine a restriction configuration range of a third type parameter set corresponding to the $M_3$ values of the CSI calculation time; and a sixth feedback module, which is configured to feed back indication information of the restriction configuration range of the third type parameter set corresponding to the $M_3$ values of the CSI calculation time.

The embodiments of the present disclosure further provide a method for processing a transmission parameter. The device includes: a twenty-third determining module, which is configured to determine a configuration of a transmission parameter set of a data channel; a twenty-fourth determining module, which is configured to determine a transmission configuration of a response message according to the configuration of the transmission parameter set of the data channel, where the transmission configuration of the response message includes: a transmission position of the response message, and a type of a channel carrying the response message; and a sixth processing module, which is configured to send or receive data according to the transmission configuration of the response message.

The embodiments of the present disclosure further provide a storage medium. The storage medium includes stored programs which, when executed, perform the method of any one of the embodiments described above.

The embodiments of the present disclosure further provide a processor. The processor is configured to execute programs which, when executed, perform the method of any one of the embodiments described above.

In application of the embodiments of the present disclosure, a base station, after determining a configuration value of a first type parameter set, determines a configuration range of a starting symbol position of an uplink data channel according to the configuration value of the first type parameter set, selects the starting symbol position of the uplink data channel from the configuration range of the starting symbol position of the uplink data channel, and notifies a receiving end of the selected starting symbol position of the uplink data channel, such that a terminal can flexibly process data according to the starting symbol position of the uplink data channel. Therefore, the present disclosure may solve the problem in the related art of high cost and time inflexibility when the terminal processes the service, thereby achieving effects of reducing service processing cost and flexibly processing the service.

DETAILED DESCRIPTION

The present disclosure will be described hereinafter in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

In the study process, the inventors find that in the related art, based on a time unit receiving DCI, offset values of some time units are defined and left to the terminal for processing above tasks. This offset value is relatively fixed.

Figure 1:
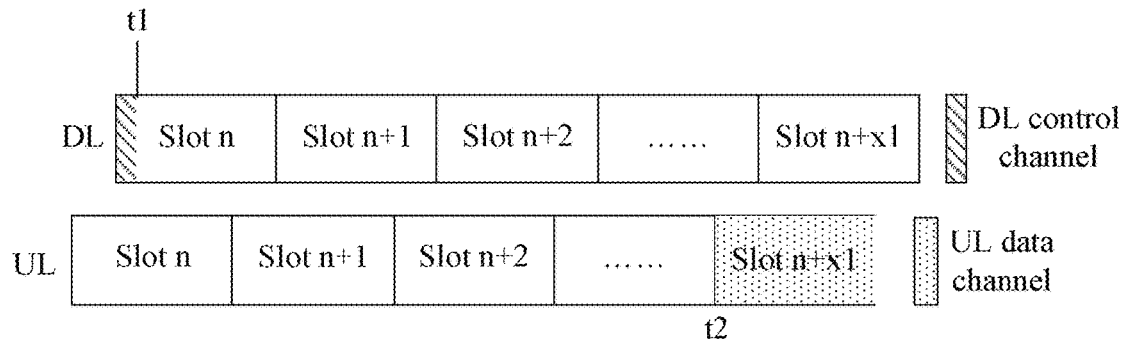
FIG. 1 is a schematic diagram of processing time for sending preparation of uplink data in the related art.

Processing time for sending preparation of UL data (Tx Processing time): a terminal usually sends UL data on an x-th time unit after receiving an UL grant (one type of DCI), and in the case of time division duplexing (TDD), if an x1-th time unit cannot be used for sending uplink information, the sending is delayed onto a next time unit that can send uplink information; x1 is usually an agreed value or is a value pre-configured by a base station via high-layer signaling; in a case of frequency division duplexing (FDD), the processing time for sending preparation of UL data is as shown in FIG. 1.

Figure 2A:
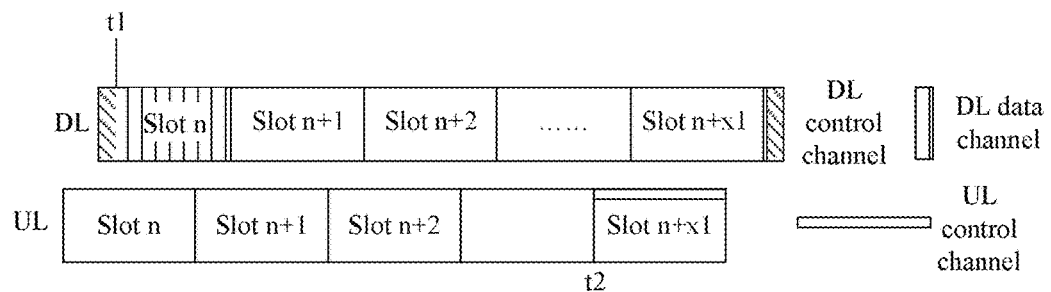
FIG. 2A is a schematic diagram of processing time for demodulation and reception of downlink data in the related art.

Processing time for demodulation and reception of DL data (Rx Processing time): a terminal usually sends an ACK/NACK response on an x2-th time unit where the DL data is received, and in the case of TDD, if the x2-th time unit cannot be used for sending uplink information, the sending is delayed onto a next time unit that can send uplink information; in a case of FDD, processing time for demodulation and reception of DL data is as shown in FIG. 2a.

Figure 2B:
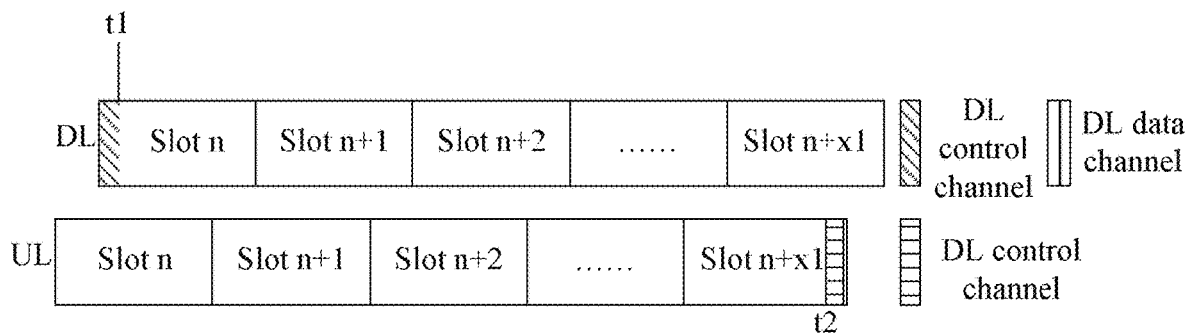
FIG. 2B is a schematic diagram of processing time for measurement feedback of downlink channel state information in the related art.

Processing time for measurement feedback of DL channel state information (CSI Processing time): a terminal usually reports CSI on an x3-th time unit after receiving aperiodic feedback triggering signaling sent by DL, and in the case of TDD, if the x3-th time unit cannot be used for sending uplink information, the sending is delayed onto a next time unit that can send uplink information; in the case of FDD, processing time for measurement feedback of DL channel state information is shown in FIG. 2B.

It can be seen that x1, x2 and x3 are agreed or are configured via radio resource control (RRC) signaling, and have poor flexibility.

When this manner is applied in a 4G system, since differences of processing task complexity and consumed time of the terminal in various cases are not very large, the processing time x1, x2 and x3 is agreed or configured according to the consumed time corresponding to the maximum complexity. Since x1, x2 and x3 are not more than 5 ms, when one slot is 1 ms, the time is not more than 5 ms, such that t2−t1 can meet requirements of all terminals in all conditions, and no severe requirement is generated on a processing capability of the terminal, where t1 and t2 denote time positions, which will not reduce cost.

However, in a 5G new radio (NR) system, since a higher order modulation manner, more antennas, more beam transmission, a bigger bandwidth and a higher transmission rate are supported, calculation amount of the terminal varies greatly when processing different tasks. In another aspect, transmission requirements for different services vary greatly. For example, some services (e.g., ultra reliable & low latency communication (URLLC) with low latency and high reliability) have demanding low-latency requirements, but some services (e.g., file transfer protocol (FTP)) are not sensitive to the latency, which may significantly increase hardware cost of the terminal if the largest computation amount and the most demanding latency requirements are considered.

Figure 3:
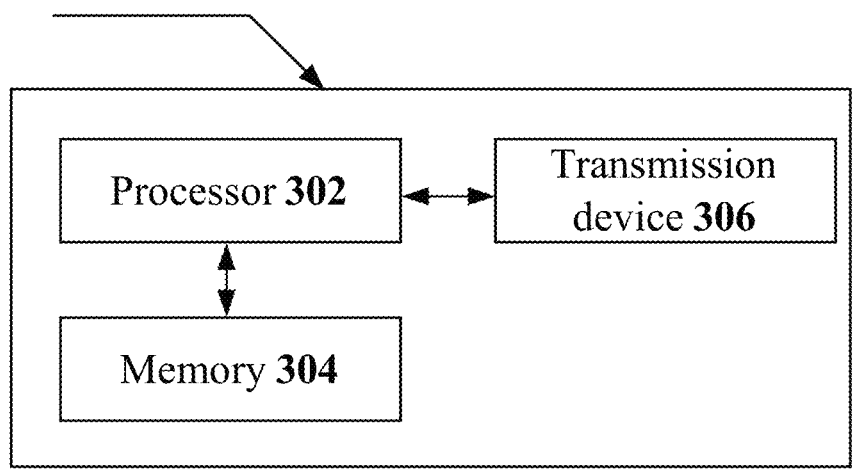
FIG. 3 is a block diagram of hardware of a mobile terminal of a method for configuring a starting symbol position of an uplink data channel according to an embodiment of the present disclosure.

Method embodiments provided by the present disclosure may be executed in a mobile terminal, a computer terminal or other similar computing devices. Taking the method to be executed in the mobile terminal as an example, FIG. 3 is a block diagram of hardware of a mobile terminal of a method for configuring a starting symbol position of an uplink data channel according to an embodiment of the present disclosure. As shown in FIG. 3, a mobile terminal 30 may include one or more (only one is shown in FIG. 3) processors 302 (the processor 302 may include, but is not limited to, a processing device such as a microcontroller unit (MCU) or a field-programmable gate array (FPGA)), a memory 304 configured to store data, and a transmission device 306 with a communication function. It should be understood by those skilled in the art that the structure shown in FIG. 3 is merely illustrative, and not intended to limit the structure of the electronic apparatus described above. For example, the mobile terminal 30 may further include more or fewer components than the components shown in FIG. 3, or may have a configuration different from the configuration shown in FIG. 3.

The memory 304 may be configured to store software programs and modules of application software, such as program instructions/modules corresponding to the method for configuring a starting symbol position of an uplink data channel in the embodiments of the present disclosure. The processors 302 execute the software programs and modules stored in the memory 304 to perform various functional applications and data processing, that is, to implement the method described above. The memory 304 may include a high-speed random access memory, or may further include a nonvolatile memory such as one or more magnetic storage apparatuses, flash memories or other nonvolatile solid-state memories. In some examples, the memory 304 may further include memories that are remotely disposed with respect to the processors 302. These remote memories may be connected to the mobile terminal 30 via a network. Examples of the above network include, but are not limited to, the Internet, an intranet, a local area network, a mobile communication network and a combination thereof.

The transmission device 306 is configured to receive or send data via a network. Specific examples of the preceding network may include a wireless network provided by a communication provider of the mobile terminal 30. In one example, the transmission device 306 includes a network interface controller (NIC), which may be connected to other network devices via a base station and thus is capable of communicating with the Internet. In one example, the transmission device 306 may be a radio frequency (RF) module, which is configured to communicate with the Internet in a wireless way.

Figure 4:
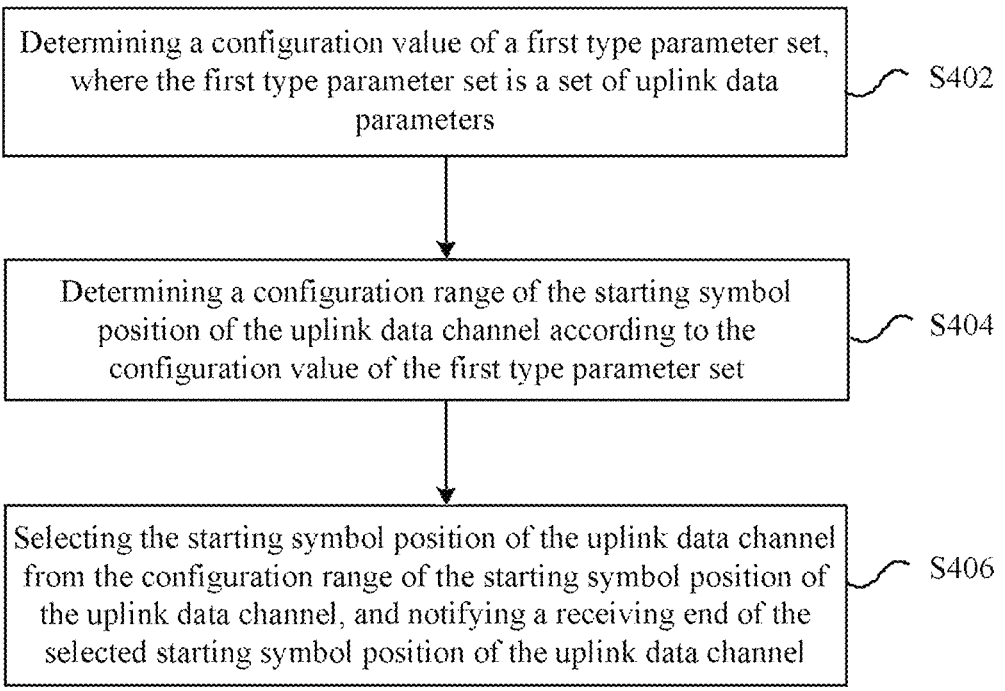
FIG. 4 is a flowchart of a method for configuring a starting symbol position of an uplink data channel according to an embodiment of the present disclosure.

An embodiment provides a method for configuring a starting symbol position of an uplink data channel. FIG. 4 is a flowchart of a method for configuring a starting symbol position of an uplink data channel according to an embodiment of the present disclosure. As shown in FIG. 4, the method includes steps S402, S404 and S406 described below.

In step S402, a configuration value of a first type parameter set is determined, where the first type parameter set is a set of uplink data parameters.

In step S404, a configuration range of the starting symbol position of the uplink data channel is determined according to the configuration value of the first type parameter set.

In step S406, the starting symbol position of the uplink data channel is selected from the configuration range of the starting symbol position of the uplink data channel, and a receiving end is notified of the selected starting symbol position of the uplink data channel.

Through the above steps, a base station, after determining a configuration value of a first type parameter set, determines a configuration range of a starting symbol position of an uplink data channel according to the configuration value of the first type parameter set, selects the starting symbol position of the uplink data channel from the configuration range of the starting symbol position of the uplink data channel, and notifies a receiving end of the selected starting symbol position of the uplink data channel, such that a terminal can flexibly process data according to the starting symbol position of the uplink data channel. Therefore, the problem in the related art of high cost and time inflexibility when the terminal processes a service can be solved, thereby achieving effects of reducing service processing cost and flexibly processing the service.

In one embodiment, the above steps may, but are not limited to, be executed by the base station.

In an optional embodiment, the first type parameter set includes at least one of: a transmission block size or a code block size, an available resource element (RE) number, a transmission layer number, a modulation parameter or a coding parameter, a Numerology parameter, a DCI format type or size, a transmission technology, a maximum DCI number, a symbol number occupied by a physical uplink shared channel (PUSCH), a user category, a DCI location, a waveform, or a timing advance.

In an optional embodiment, the symbol position in the configuration range is not less than an i-th time domain symbol, where i denotes a time domain symbol index, and a value range of i is determined according to at least one of transmission parameters included in the first type parameter set.

Figure 5:
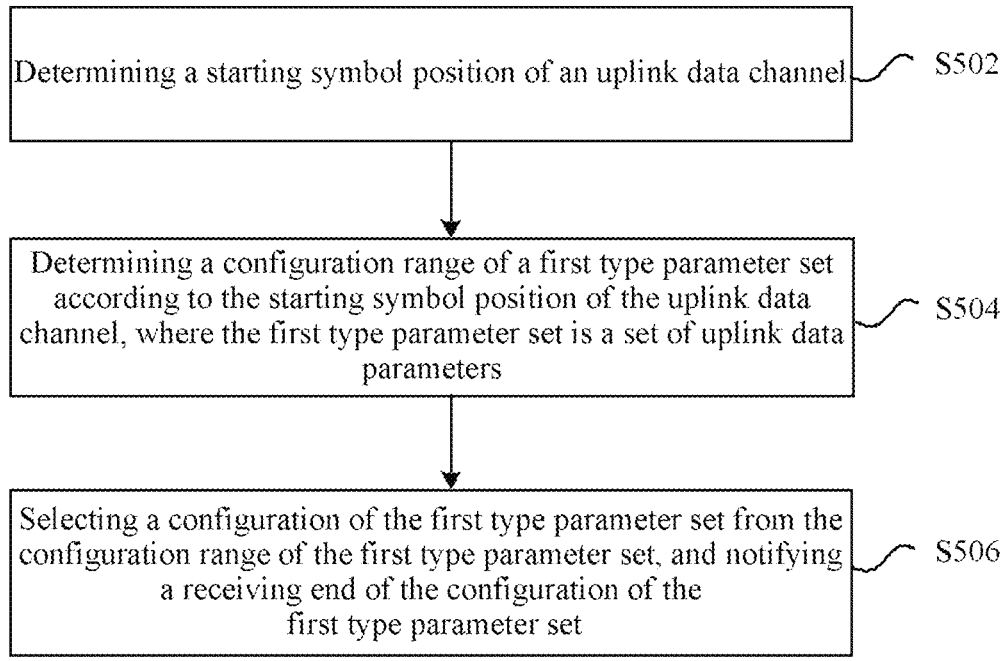
FIG. 5 is a flowchart of a method for configuring an uplink parameter according to an embodiment of the present disclosure.

An embodiment provides a method for configuring an uplink parameter. FIG. 5 is a flowchart of a method for configuring an uplink parameter according to an embodiment of the present disclosure. As shown in FIG. 5, the method includes steps S502, S504 and S506 described below.

In step S502, a starting symbol position of an uplink data channel is determined.

In step S504, a configuration range of a first type parameter set is determined according to the starting symbol position of the uplink data channel, where the first type parameter set is a set of uplink data parameters.

In step S506, a configuration of the first type parameter set is selected in the configuration range of the first type parameter set, and a receiving end is notified of the configuration of the first type parameter set.

Through the above steps, the base station, after determining a starting symbol position of an uplink data channel, determines a configuration range of a first type parameter set according to the starting symbol position of the uplink data channel, where the first type parameter set is a set of uplink data parameters, selects a configuration of the first type parameter set in the configuration range of the first type parameter set, and notifies a receiving end of the configuration of the first type parameter set, such that the terminal can determine an uplink data parameter and process related services of uplink data according to the uplink data parameter. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the first type parameter set includes at least one of: a transmission block size, a code block size, an available RE number, a transmission layer number, a modulation parameter or a coding parameter, a Numerology parameter, a maximum DCI number, a symbol number occupied by a PUSCH, or a DCI location.

Figure 6:
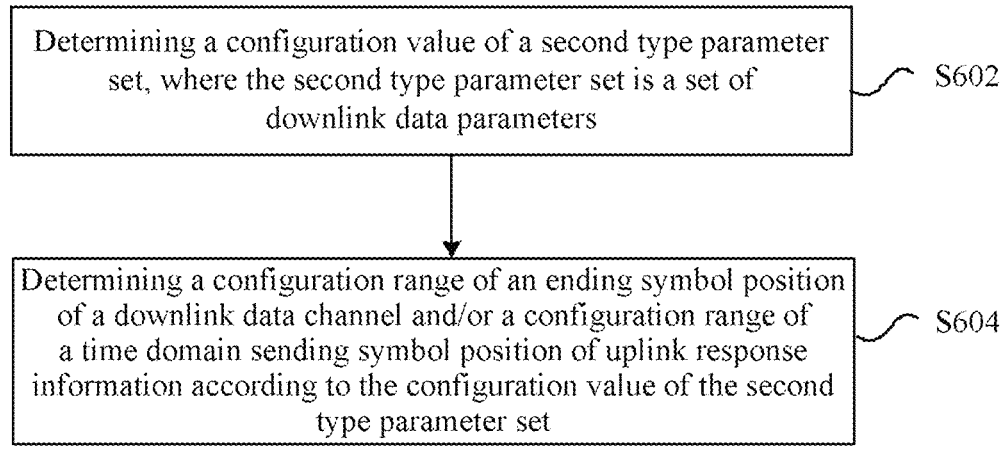
FIG. 6 is a flowchart of a method for configuring a position parameter according to an embodiment of the present disclosure.

An embodiment provides a method for configuring a position parameter. FIG. 6 is a flowchart of a method for configuring a position parameter according to an embodiment of the present disclosure. As shown in FIG. 6, the method includes steps S602 and S604 described below.

In step S602, a configuration value of a second type parameter set is determined, where the second type parameter set is a set of downlink data parameters.

In step S604, a configuration range of an ending symbol position of a downlink data channel and/or a configuration range of a time domain sending symbol position of uplink response information are determined according to the configuration value of the second type parameter set.

Through the above steps, the base station, after determining a configuration value of a second type parameter set, where the second type parameter set is a set of downlink data parameters, determines a configuration range of an ending symbol position of a downlink data channel and/or a configuration range of a time domain sending symbol position of uplink response information according to the configuration value of the second type parameter set, selects the ending symbol position of the downlink data channel in the configuration range of the ending symbol position of the downlink data channel, and notifies a receiving end of the selected ending symbol position of the downlink data channel, such that the terminal can process a downlink service according to the ending symbol position of the downlink data channel. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the second type parameter set includes at least one of: a transmission block size, a code block size, an available RE number, a transmission layer number, a modulation parameter, a coding parameter, a Numerology parameter, a DCI format type or size, a maximum DCI number, a symbol number occupied by a PUSCH, a User category, a DCI location, a waveform, a transmission number, a precoding parameter, a mapping manner, or a timing advance.

In an optional embodiment, after the configuration range of the ending symbol position of the downlink data channel is determined according to the configuration value of the second type parameter set, the ending symbol position of the downlink data channel is selected in the configuration range of the ending symbol position of the downlink data channel, and a receiving end is notified of the selected ending symbol position of the downlink data channel.

In an optional embodiment, the ending symbol position of the downlink data channel in the configuration range includes one of: the ending symbol position of the downlink data channel in the configuration range is not greater than a j-th time domain symbol, where j denotes a time domain symbol index, and a value range of j is determined according to at least one of transmission parameters included in the second type parameter set.

In an optional embodiment, the ending symbol position of the downlink data channel in the configuration range includes one of: the time domain sending symbol position of the uplink response information in the configuration range is not less than a k-th time domain symbol, where k denotes a time domain symbol index, and a value range of j is determined according to at least one of transmission parameters included in the second type parameter set.

In an optional embodiment, the ending symbol position of the downlink data channel and the time domain sending symbol position of the uplink response information include: an interval between the ending symbol position of the downlink data channel and the time domain sending symbol position of the uplink response information in the configuration range is not less than m symbols, where m is an integer greater than 1, and a value of m is determined according to at least one of transmission parameters included in the second type parameter set.

Figure 7:
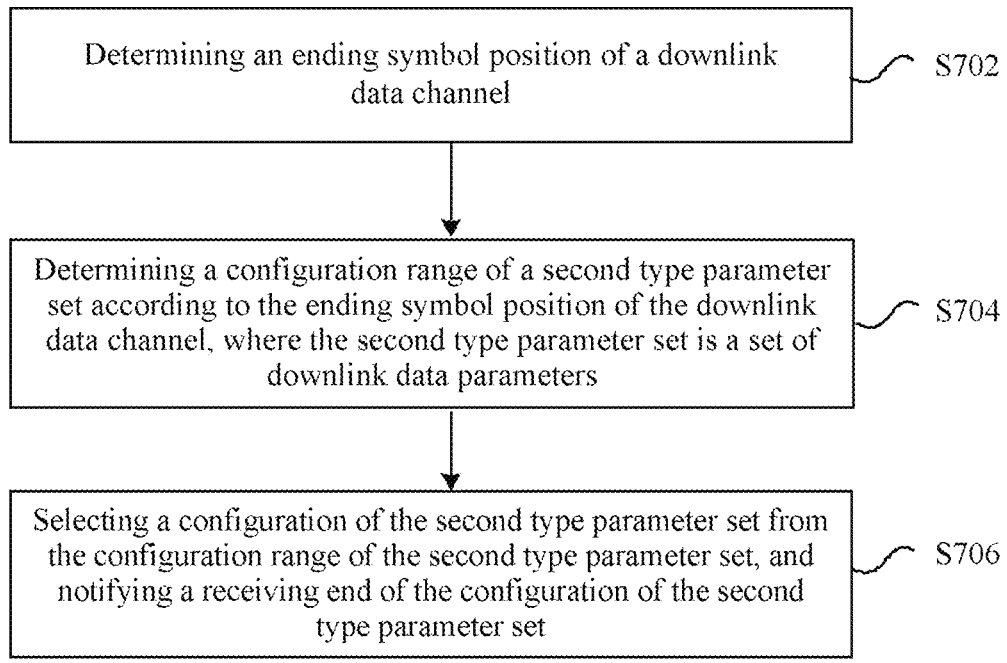
FIG. 7 is a flowchart of a method for configuring a downlink parameter according to an embodiment of the present disclosure.

An embodiment provides a method for configuring a downlink parameter. FIG. 7 is a flowchart of a method for configuring a downlink parameter according to an embodiment of the present disclosure. As shown in FIG. 7, the method includes steps S702, S704 and S706 described below.

In step S702, an ending symbol position of a downlink data channel is determined.

In step S704, a configuration range of a second type parameter set is determined according to the ending symbol position of the downlink data channel, where the second type parameter set is a set of downlink data parameters.

In step S706, a configuration of the second type parameter set is selected in the configuration range of the second type parameter set, and a receiving end is notified of the configuration of the second type parameter set.

Through the above steps, the base station, after determining an ending symbol position of a downlink data channel, determines a configuration range of a second type parameter set according to the ending symbol position of the downlink data channel, where the second type parameter set is a set of downlink data parameters, selects a configuration of the second type parameter set in the configuration range of the second type parameter set, and notifies a receiving end of the configuration of the second type parameter set, such that the terminal can flexibly process the data according to the downlink data parameter. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

Figure 8:
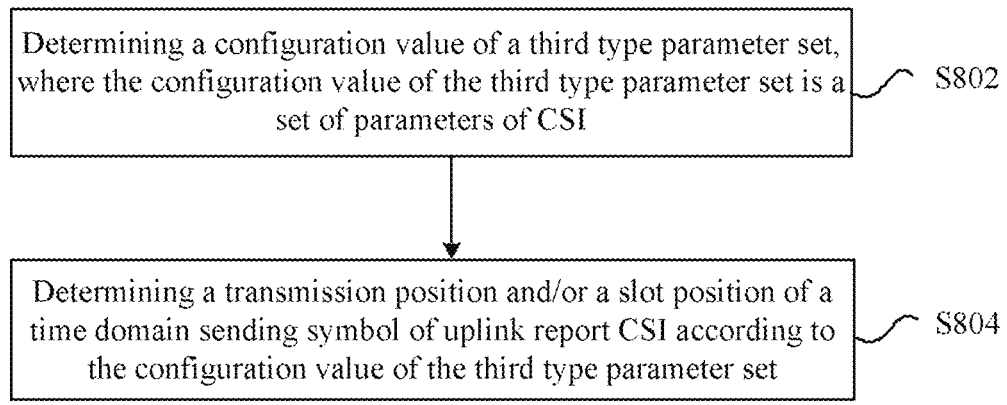
FIG. 8 is a flowchart of a method for determining a transmission position of channel state information according to an embodiment of the present disclosure.

An embodiment provides a method for determining a transmission position of CSI. FIG. 8 is a flowchart of a method for determining a transmission position of channel state information according to an embodiment of the present disclosure. As shown in FIG. 8, the method includes steps S802 and S804 described below.

In step S802, a configuration value of a third type parameter set is determined, where the configuration value of the third type parameter set is a set of parameters of CSI.

In step S804, a transmission position and/or a slot position of a time domain sending symbol of uplink report CSI are determined according to the configuration value of the third type parameter set.

Through the above steps, the base station determines a configuration value of a third type parameter set, where the configuration value of the third type parameter set is a set of parameters of CSI, and determines a transmission position and/or a slot domain position of a time domain sending symbol of uplink report CSI according to the configuration value of the third type parameter set, such that the terminal can flexibly process the data according to the transmission position and/or the slot domain position of the time domain sending symbol of the uplink report CSI. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the third type parameter set includes at least one of: a measurement reference signal position, an interference measurement resource (IMR) position, a port number, a feedback mode configuration, a feedback granularity, a quantization manner, a quantized bandwidth size or a resource block (RB) number, a codebook configuration, a transmission assumption of a CSI calculator, or a timing advance.

Figure 9:
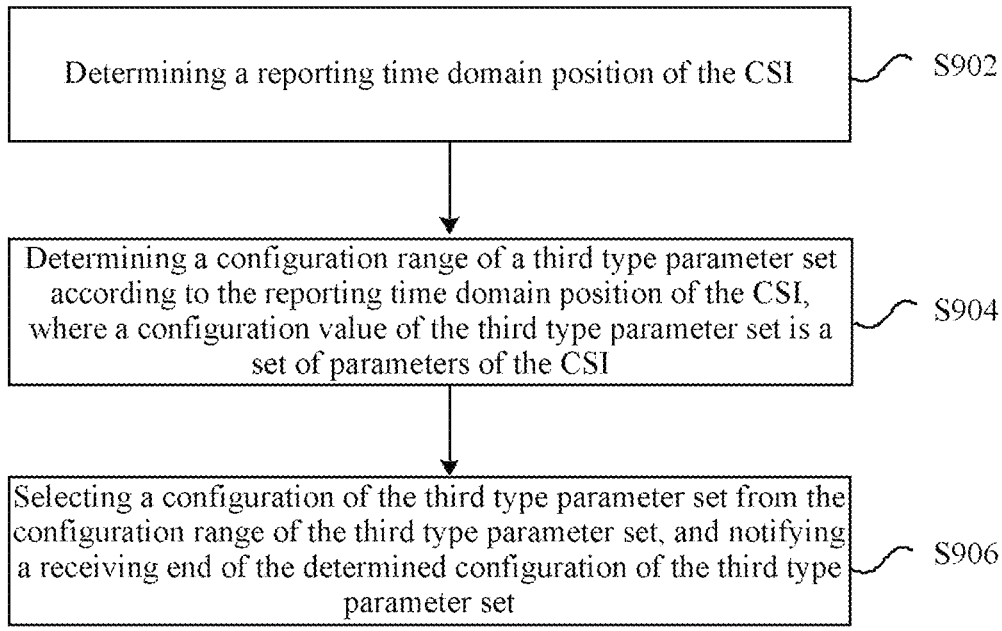
FIG. 9 is a flowchart of a method for configuring channel state information according to an embodiment of the present disclosure.
Figure 10:
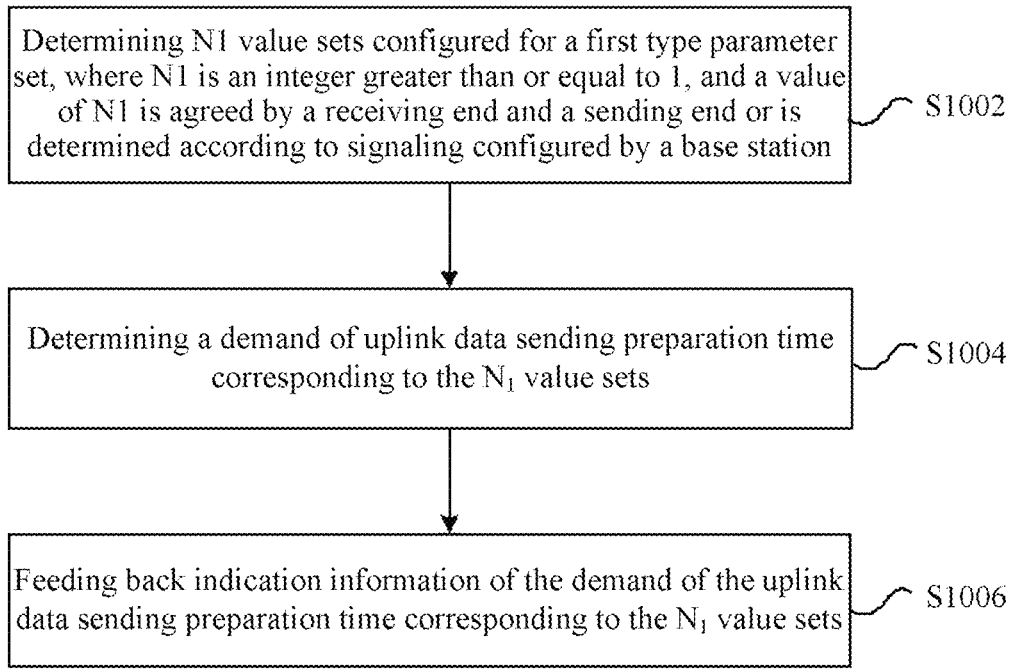
FIG. 10 is a flowchart one of a method for feeding back a time parameter according to an embodiment of the present disclosure.

An embodiment provides a method for configuring CSI. FIG. 9 is a flowchart of a method for configuring channel state information according to an embodiment of the present disclosure. As shown in FIG. 9, the method includes steps S902, S904 and S906 described below.

In step S902, a reporting time domain position of the CSI is determined.

In step S904, a configuration range of a third type parameter set is determined according to the reporting time domain position of the CSI, where a configuration value of the third type parameter set is a set of parameters of the CSI.

In step S906, a configuration of the third type parameter set is selected in the configuration range of the third type parameter set, and a receiving end is notified of the determined configuration of the third type parameter set.

Through the above steps, the base station, after determining a reporting time domain position of the CSI, determines a configuration range of a third type parameter set according to the reporting time domain position of the CSI, where a configuration value of the third type parameter set is a set of parameters of the CSI, selects a configuration of the third type parameter set from the configuration range of the third type parameter set, and notifies a receiving end of the determined configuration of the third type parameter set, such that the terminal can flexibly process the data according to the fact that the configuration value is the set of parameters of the CSI. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the third type parameter set includes at least one of: an IMR position, a port number, a feedback mode configuration, a feedback granularity, a quantization manner, a quantized bandwidth size or an RB number, a codebook configuration, a transmission assumption of a CSI calculator, a time domain position of a reference signal for uplink report CSI measurement, or a time domain position of an IMR for uplink report CSI measurement.

In an optional embodiment, the ending symbol position of the downlink data channel and the time domain sending symbol position of the uplink response information include: an interval between the ending symbol position of the downlink data channel and the time domain sending symbol position of the uplink response information in the configuration range is not less than m symbols, where m is an integer greater than 1, and a value of m is determined according to at least one of transmission parameters included in the second type parameter set.

An embodiment provides a method for configuring a downlink parameter. FIG. 7 is a flowchart of a method for configuring a downlink parameter according to an embodiment of the present disclosure. As shown in FIG. 7, the method includes steps S702, S704 and S706 described below.

In step S702, an ending symbol position of a downlink data channel is determined.

In step S704, a configuration range of a second type parameter set is determined according to the ending symbol position of the downlink data channel, where the second type parameter set is a set of downlink data parameters.

In step S706, a configuration of the second type parameter set is selected in the configuration range of the second type parameter set, and a receiving end is notified of the configuration of the second type parameter set.

Through the above steps, the base station, after determining an ending symbol position of a downlink data channel, determines a configuration range of a second type parameter set according to the ending symbol position of the downlink data channel, where the second type parameter set is a set of downlink data parameters, selects a configuration of the second type parameter set in the configuration range of the second type parameter set, and notifies a receiving end of the configuration of the second type parameter set, such that the terminal can flexibly process the data according to the downlink data parameter. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

An embodiment provides a method for determining a transmission position of CSI. FIG. 8 is a flowchart of a method for determining a transmission position of channel state information according to an embodiment of the present disclosure. As shown in FIG. 8, the method includes steps S802 and S804 described below.

In step S802, a configuration value of a third type parameter set is determined, where the configuration value of the third type parameter set is a set of parameters of CSI.

In step S804, a transmission position and/or a slot position of a time domain sending symbol of uplink report CSI are determined according to the configuration value of the third type parameter set.

Through the above steps, the base station determines a configuration value of a third type parameter set, where the configuration value of the third type parameter set is a set of parameters of CSI, and determines a transmission position and/or a slot domain position of a time domain sending symbol of uplink report CSI according to the configuration value of the third type parameter set, such that the terminal can flexibly process the data according to the transmission position and/or the slot domain position of the time domain sending symbol of the uplink report CSI. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the third type parameter set includes at least one of: a measurement reference signal position, an interference measurement resource (IMR) position, a port number, a feedback mode configuration, a feedback granularity, a quantization manner, a quantized bandwidth size or a resource block (RB) number, a codebook configuration, a transmission assumption of a CSI calculator, or a timing advance.

An embodiment provides a method for configuring CSI. FIG. 9 is a flowchart of a method for configuring channel state information according to an embodiment of the present disclosure. As shown in FIG. 9, the method includes steps S902, S904 and S906 described below.

In step S902, a reporting time domain position of the CSI is determined.

In step S904, a configuration range of a third type parameter set is determined according to the reporting time domain position of the CSI, where a configuration value of the third type parameter set is a set of parameters of the CSI.

In step S906, a configuration of the third type parameter set is selected in the configuration range of the third type parameter set, and a receiving end is notified of the determined configuration of the third type parameter set.

Through the above steps, the base station, after determining a reporting time domain position of the CSI, determines a configuration range of a third type parameter set according to the reporting time domain position of the CSI, where a configuration value of the third type parameter set is a set of parameters of the CSI, selects a configuration of the third type parameter set from the configuration range of the third type parameter set, and notifies a receiving end of the determined configuration of the third type parameter set, such that the terminal can flexibly process the data according to the fact that the configuration value is the set of parameters of the CSI. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station.

In an optional embodiment, the third type parameter set includes at least one of: an IMR position, a port number, a feedback mode configuration, a feedback granularity, a quantization manner, a quantized bandwidth size or an RB number, a codebook configuration, a transmission assumption of a CSI calculator, a time domain position of a reference signal for uplink report CSI measurement, or a time domain position of an IMR for uplink report CSI measurement.

In step 1002, $N_1$ value sets configured for a first type parameter set are determined, where $N_1$ is an integer greater than or equal to 1, and a value of $N_1$ is agreed by a receiving end and a sending end or is determined according to signaling configured by a base station.

In step S1004, a demand of uplink data sending preparation time corresponding to the $N_1$ value sets is determined.

In step S1006, indication information of the demand of the uplink data sending preparation time corresponding to the $N_1$ value sets is fed back.

Through the above steps, the terminal, after determining a demand of uplink data sending preparation time corresponding to the $N_1$ value sets, determines the demand of the uplink data sending preparation time corresponding to the $N_1$ value sets, and feeds back indication information of the demand of the uplink data sending preparation time corresponding to the $N_1$ value sets, such that the terminal can flexibly process the service. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

Figure 11:
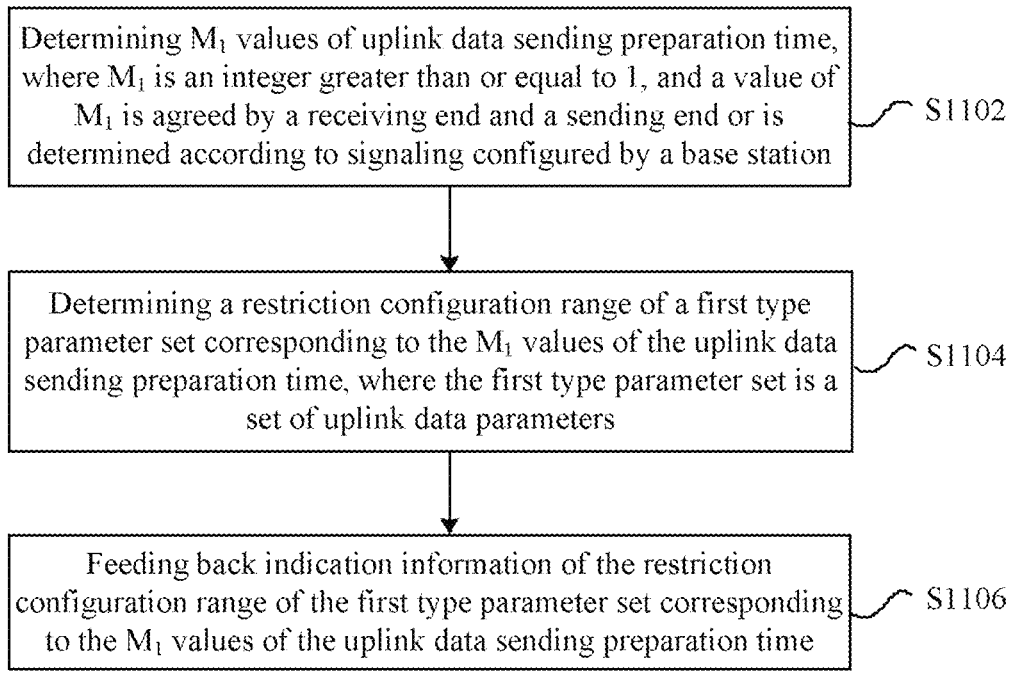
FIG. 11 is a flowchart one of a method for feeding back configuration restriction information according to an embodiment of the present disclosure.

An embodiment provides a method for feeding back configuration restriction information. FIG. 11 is a flowchart of a method for feeding back configuration restriction information according to an embodiment of the present disclosure. As shown in FIG. 11, the method includes steps S1102, S1104 and S1106 described below.

In step S1102, $M_1$ values of uplink data sending preparation time are determined, where $M_1$ is an integer greater than or equal to 1, and a value of $M_1$ is agreed by a receiving end and a sending end or is determined according to signaling configured by a base station.

In step S1104, a restriction configuration range of a first type parameter set corresponding to the $M_1$ values of the uplink data sending preparation time is determined, where the first type parameter set is a set of uplink data parameters.

In step S1106, indication information of the restriction configuration range of the first type parameter set corresponding to the $M_1$ values of the uplink data sending preparation time is fed back.

Through the above steps, the terminal, after determining $M_1$ values of uplink data sending preparation time, where $M_1$ is an integer greater than or equal to 1, and a value of $M_1$ is agreed by a receiving end and a sending end or is determined according to signaling configured by a base station, determines a restriction configuration range of a first type parameter set corresponding to the $M_1$ values of the uplink data sending preparation time, where the first type parameter set is a set of uplink data parameters to enable the terminal to flexibly process the data according to the starting symbol position of the uplink data channel, and feeds back the indication information of the restriction configuration range of the first type parameter set corresponding to the $M_1$ values of the uplink data sending preparation time, such that the terminal can flexibly process the service. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

Figure 12:
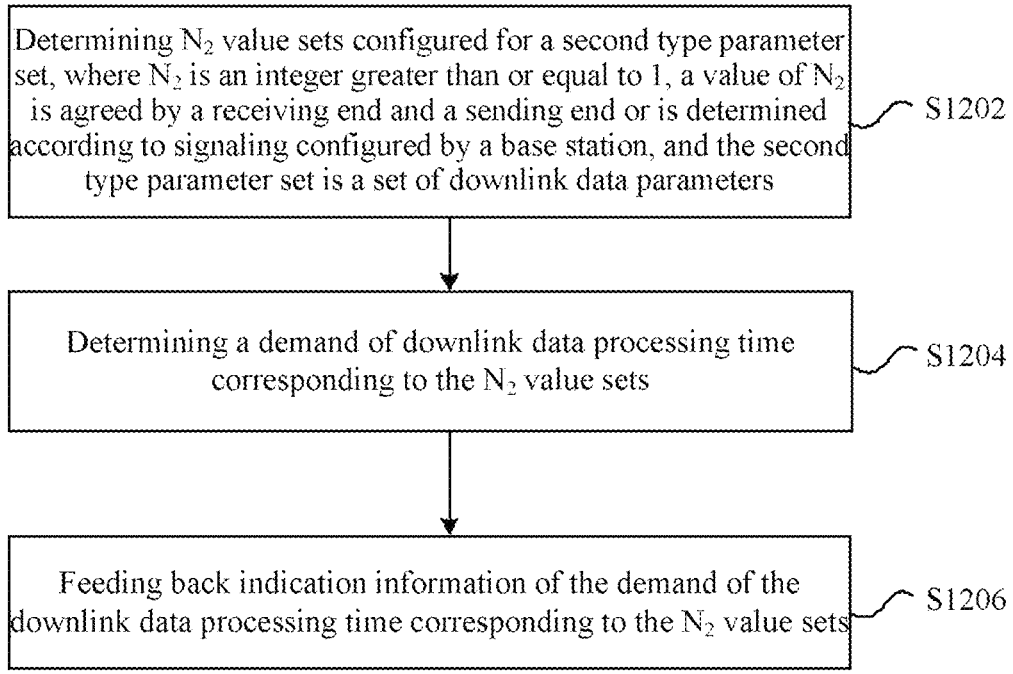
FIG. 12 is a flowchart two of a method for feeding back a time parameter according to an embodiment of the present disclosure.

An embodiment provides a method for feeding back a time parameter. FIG. 12 is a flowchart of a method for feeding back a time parameter according to an embodiment of the present disclosure. As shown in FIG. 12, the method includes steps S1202, S1204 and S1206 described below.

In step S1202, $N_2$ value sets configured for a second type parameter set are determined, where $N_2$ is an integer greater than or equal to 1, a value of $N_2$ is agreed by a receiving end and a sending end or is determined according to signaling configured by a base station, and the second type parameter set is a set of downlink data parameters.

In step S1204, a demand of downlink data processing time corresponding to the $N_2$ value sets is determined.

In step S1206, indication information of the demand of the downlink data processing time corresponding to the $N_2$ value sets is fed back.

Through the above steps, the terminal, after determining $N_2$ value sets configured for a second type parameter set, where $N_2$ is an integer greater than or equal to 1, a value of $N_2$ is agreed by a receiving end and a sending end or is determined according to signaling configured by a base station, and the second type of parameters is a set of downlink data parameters, determines a demand of downlink data processing time corresponding to the $N_2$ value sets, and feeds back indication information of the demand of the downlink data processing time corresponding to the $N_2$ value sets, such that the terminal can flexibly process the data. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

In an optional embodiment, the second type parameter set includes at least one of: a transmission block size, a code block size, an available RE number, a layer number, a DMRS number, a modulation parameter, a coding parameter, a Numerology parameter, a DCI format type or size, a maximum DCI number, a symbol number occupied by a PUSCH, a User category, a DCI location, a waveform, a transmission number, a precoding parameter, or a mapping manner.

Figure 13:
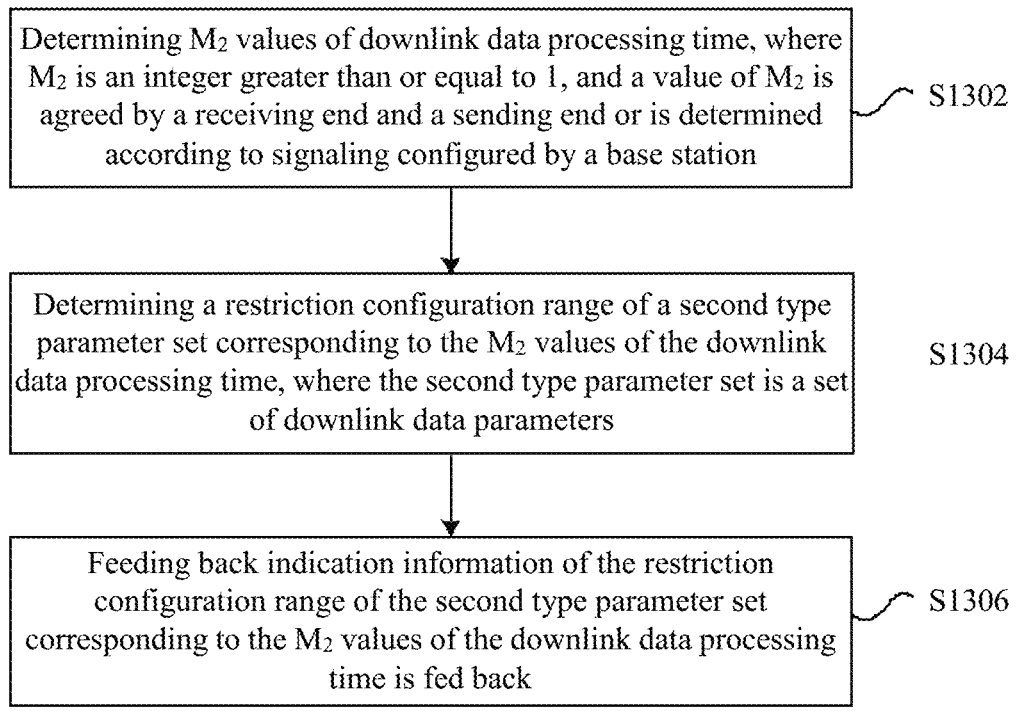
FIG. 13 is a flowchart two of a method for feeding back configuration restriction information according to an embodiment of the present disclosure.

An embodiment provides a method for feeding back configuration restriction information. FIG. 13 is a flowchart of a method for feeding back configuration restriction information according to an embodiment of the present disclosure. As shown in FIG. 13, the method includes steps S1302, S1304 and S1306 described below.

In step S1302, $M_2$ values of downlink data processing time are determined, where $M_2$ is an integer greater than or equal to 1, and a value of $M_2$ is agreed by a receiving end and a sending end or is determined according to signaling configured by a base station.

In step S1304, a restriction configuration range of a second type parameter set corresponding to the $M_2$ values of the downlink data processing time is determined, where the second type parameter set is a set of downlink data parameters.

In step S1306, indication information of the restriction configuration range of the second type parameter set corresponding to the $M_2$ values of the downlink data processing time is fed back.

Through the above steps, the terminal determines $M_2$ values of downlink data processing time, where $M_2$ is an integer greater than or equal to 1, and a value of $M_2$ is agreed by a receiving end and a sending end or is determined according to signaling configured by a base station, determines a restriction configuration range of a second type parameter set corresponding to the $M_2$ values of the downlink data processing time, where the second type parameter set is a set of downlink data parameters, and feeds back indication information of the restriction configuration range of the second type parameter set corresponding to the $M_2$ values of the downlink data processing time, such that the terminal can flexibly process the data. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

Figure 14:
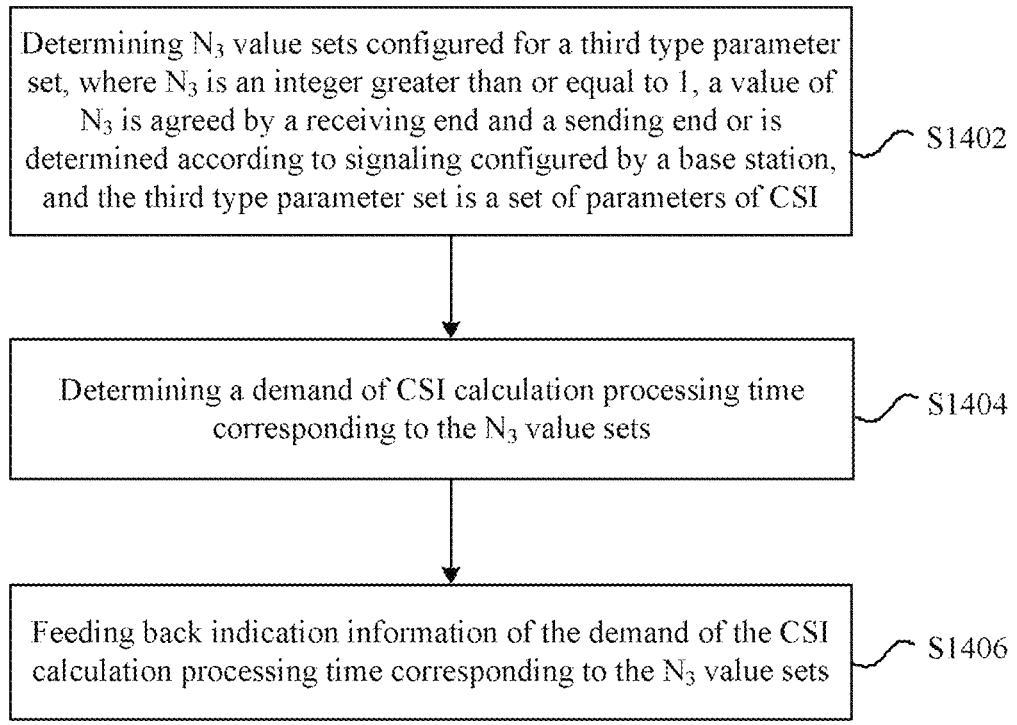
FIG. 14 is a flowchart three of a method for feeding back a time parameter according to an embodiment of the present disclosure.

An embodiment provides a method for feeding back a time parameter. FIG. 14 is a flowchart of a method for feeding back a time parameter according to an embodiment of the present disclosure. As shown in FIG. 14, the method includes steps S1402, S1404 and S1406 described below.

In step S1402, $N_3$ value sets configured for a third type parameter set are determined, where $N_3$ is an integer greater than or equal to 1, a value of $N_3$ is agreed by a receiving end and a sending end or is determined according to signaling configured by a base station, and the third type parameter set is a set of parameters of CSI.

In step S1404, a demand of CSI calculation processing time corresponding to the $N_3$ value sets is determined.

In step S1406, indication information of the demand of the CSI calculation processing time corresponding to the $N_3$ value sets is fed back.

Through the above steps, the terminal, after determining $N_3$ value sets configured for a third type parameter set, where $N_3$ is an integer greater than or equal to 1, a value of $N_3$ is agreed by a receiving end and a sending end or is determined according to signaling configured by a base station, and the third type of parameters is a set of parameters of CSI, determines a demand of CSI calculation processing time corresponding to the $N_3$ value sets, and feeds back indication information of the demand of the CSI calculation processing time corresponding to the $N_3$ value sets, such that the terminal can flexibly process the data. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

In an optional embodiment, the third type parameter set includes at least one of: a reference signal position, an IMR position, a port number, a feedback mode configuration, a feedback granularity, a quantization manner, a quantized bandwidth size or an RB number, a codebook configuration, or a transmission assumption of a CSI calculator.

Figure 15:
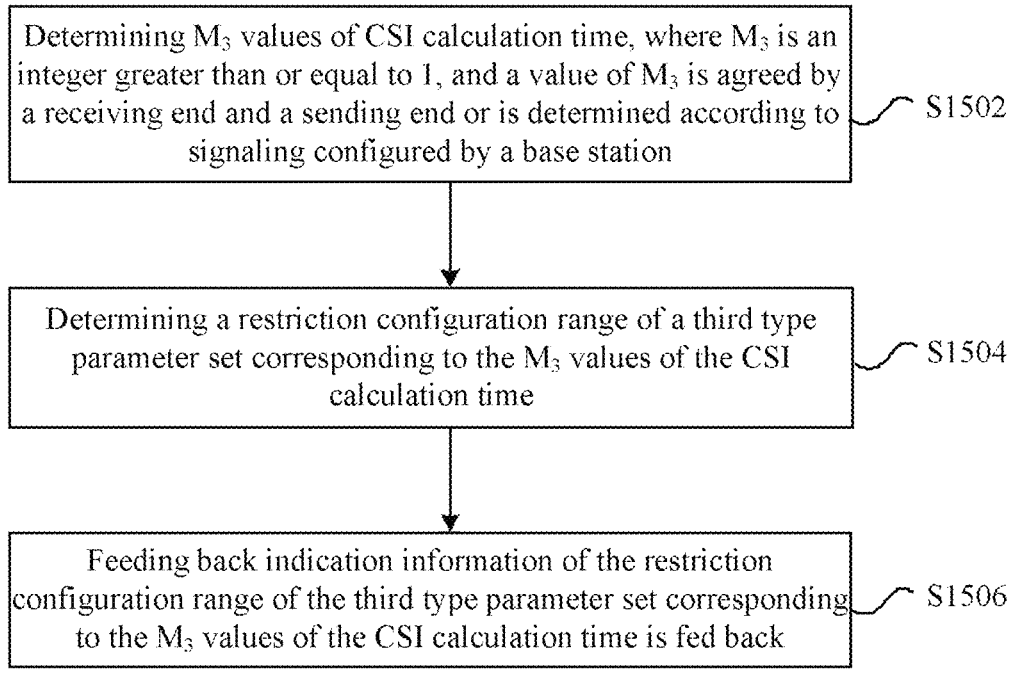
FIG. 15 is a flowchart three of a method for feeding back configuration restriction information according to an embodiment of the present disclosure.

An embodiment provides a method for feeding back configuration restriction information. FIG. 15 is a flowchart of a method for feeding back configuration restriction information according to an embodiment of the present disclosure. As shown in FIG. 15, the method includes steps S1502, S1504 and S1506 described below.

In step S1502, $M_3$ values of CSI calculation time are determined, where $M_3$ is an integer greater than or equal to 1, and a value of $M_3$ is agreed by a receiving end and a sending end or is determined according to signaling configured by a base station.

In step S1504, a restriction configuration range of a third type parameter set corresponding to the $M_3$ values of the CSI calculation time is determined.

In step S1506, indication information of the restriction configuration range of the third type parameter set corresponding to the $M_3$ values of the CSI calculation time is fed back.

Through the above steps, the terminal can flexibly process the data according to the starting symbol position of the uplink data channel. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the terminal.

Figure 16:
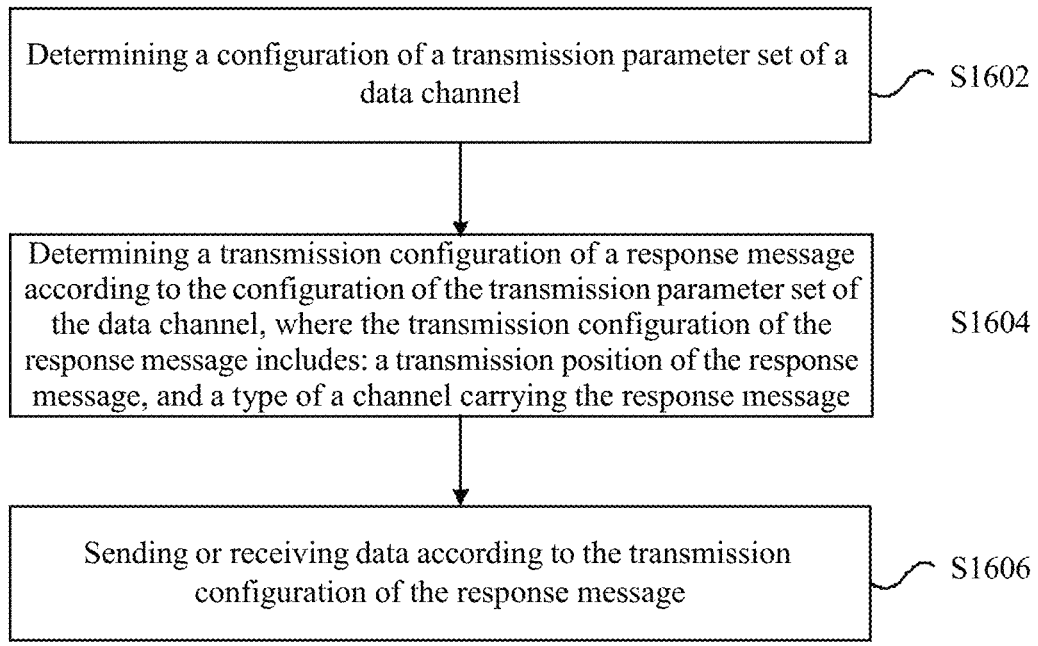
FIG. 16 is a flowchart of a method for processing a transmission parameter according to an embodiment of the present disclosure.

An embodiment provides a method for processing a transmission parameter. FIG. 16 is a flowchart of a method for processing a transmission parameter according to an embodiment of the present disclosure. As shown in FIG. 16, the method includes steps S1602, S1604 and S1606 described below.

In step S1602, a configuration of a transmission parameter set of a data channel is determined.

In step S1604, a transmission configuration of a response message is determined according to the configuration of the transmission parameter set of the data channel, where the transmission configuration of the response message includes: a transmission position of the response message, and a type of a channel carrying the response message.

In S1606, data is sent or received according to the transmission configuration of the response message.

Through the above steps, the terminal or the base station, after determining a configuration of a transmission parameter set of a data channel, determines a transmission configuration of a response message according to the configuration of the transmission parameter set of the data channel, where the transmission configuration of the response message includes: a transmission position of the response message and a type of a channel carrying the response message, sends or receives data according to the transmission configuration of the response message, such that the terminal can flexibly process the data according to the starting symbol position of the uplink data channel. Therefore, the problem in the related art of high cost and time inflexibility when the terminal processes the service can be solved, thereby achieving effects of reducing the service processing cost and flexibly processing the service.

In one embodiment, the above steps may, but are not limited to, be executed by the base station or the terminal.

In the above embodiments, $N_1$, $N_2$, $N_3$, $M_1$, $M_2$ and $M_3$ may be the same, or may be different.

Scenario of a Self-Contained Structure:

In the NR, a self-contained structure may be used for one or more time intervals. The main advantage is that this structure does not need to define a timing relationship between complex time domain time intervals, which has good compatibility and scalability. Taking the time interval being a slot as an example, the processing of the sending preparation of the uplink data, the demodulation and reception and acknowledgement response of the downlink data and measurement feedback of the downlink CSI are completed within one slot. In this case, the design needs to be reasonable to support the transmission resource position determining method that is self-contained and needs great flexibility as much as possible without increasing complexity.

Figure 17:
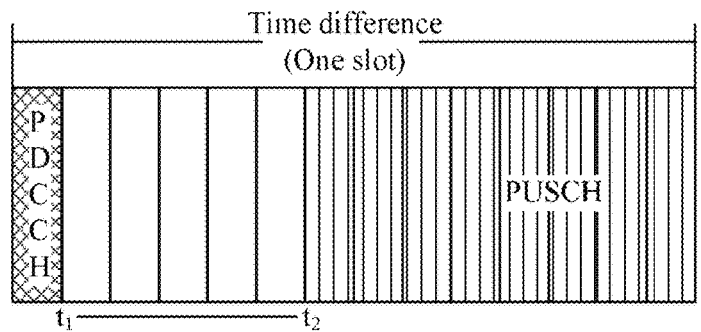
FIG. 17 is a schematic diagram of preparation time of uplink data sending according to an embodiment of the present disclosure.

UL Data Processing:

In FIG. 17, a time difference between t1 and t2 is the maximum preparation time of uplink data sending. It is to be noted that the DCI position sent in the physical downlink control channel (PDCCH) is not necessarily on a first symbol, but may be on a second or a third symbol, which reduces the time difference between t1 and t2. A starting position of the PUSCH may be flexibly indicated by the base station via control signaling, and the position may be move forward or backward. Factors that affect UL Data processing time demands include at least one of the following:

1. transmission block size/code block size: which represents the size of a transmission block (TB) or the size of a code block (CB); one TB includes one or more CBs, and the larger the TB and the CB, the more complex the coding and interleaving will be, and the more time for processing will need;
2. available RE number: which represents the number of available REs; the greater the RE number, the greater the number of modulation symbols needed to be transmitted will be, and the more complex the processing will be; the available REs may be counted from a signal carrier frequency or from multiple carrier frequencies;
3. layer number or the DMRS port number: which represents the transmission layer number; multiple layers may be used for simultaneous transmission when the degree of freedom of spatial multiplexing is high enough, each layer transmits a different number, and since more data is needed to be processed and some complex layer mapping processing may be added, the greater the layer number, the more complex will be; the DMRS port number is usually the same as the layer number, and in some cases, the DMRS port number is a multiple of the layer number;
4. modulation/coding parameter: the modulation mode used in the existing wireless communication system mainly includes binary phase shift keying (BPSK) modulation, quadrature phase shift keying (QPSK) modulation, 16 quadrature amplitude modulation (16 QAM), 64 QAM, 256 QAM and the like, and different modulation modes have different constellation maps and also have different complexities; the coding technology currently has low-density parity-check code (LDPC), turbo code, convolution code (CC), polar code and other manners, and different types of coding have different complexities, for example, the complexity of the LDPC is less than the complexity of the turbo code; there are also multiple code rates, such as $\frac{1}{3}$, $\frac{1}{2}$, $\frac{1}{4}$, $\frac{3}{4}$, $\frac{5}{6}$ and the like, and in a condition with the same input bit, the lower the code rate, the more complex will be;
5. Numerology parameter: which mainly includes a sub-carrier number/interval, a fast Fourier transform (FFT) point number, a time domain symbol (e.g., an OFDM symbol) length, a sampling frequency and other parameters; the complexity corresponding to different parameters is also different;
6. DCI format type/size: different DCI format types or different DCI format sizes have different detection complexities; since the sending preparation of the uplink data is started only after the DCI is successfully detected, the more time spent on the DCI detection, the less time left for data sending preparation;
7. multiple input multiple output (MIMO) scheme: the transmission technology includes multiple technologies, such as space frequency block code (SFBC)/space time block code (STBC) of diversity transmission, cyclic shift diversity (CCD) technology, and precoder cycling; these technologies have different complexities and different processing time;
8. maximum DCI number: the terminal may receive multiple DCI, and needs more processing time if it receives multiple DCI;
9. PUSCH (uplink data/shared channel) symbol number: the number of symbols occupied by the uplink of the terminal is greatly different;
10. UE category: different types of UEs have different capability levels, and need different time when processing the same service;
11. waveform: the uplink transmission may select multiple different waveforms, such as single carrier frequency division multiple access (SC-FDMA), cyclic prefix-orthogonal frequency division multiplexing (OFDM) and the like; different waveforms have different baseband processing complexities and need different processing time;
12. interleaving parameter: there are multiple cases of interleaving and non-interleaving, and the processing complexity will be higher in a case of interleaving enabling;
13. precoding parameter, different precoding manners, and different precoding granularities; and
14. timing advance (TA): this parameter is used for sending advance of the terminal to overcome some problems caused by different arrival time caused by different transmission paths of different UEs; the bigger the TA, the shorter available processing time for the UE.

The enhancement of the flexibility of the processing time includes steps described below.

An embodiment of the present disclosure provides a method for configuring a starting symbol position of an uplink data channel (base station side). The method includes steps 101, 102 and 103.

In step 101, a configuration value of a first type parameter set is determined.

The first type parameter set includes one or more combinations of following parameters: a transmission block size/a code block size, an available RE number, a layer number or a DMRS port number, a modulation and coding parameter, a Numerology parameter, a DCI format type/size, a maximum DCI number, a total OFDM symbol number occupied by PUSCH, UE category, a DCI location, a waveform, and a timing advance.

In step 102, a configurable range of the starting symbol position of the uplink data channel is determined.

The symbol position in the configurable range is not less than an i-th symbol, where i denotes a symbol index, and a value of i is determined according to one or more parameters in the first type parameter set.

In step 103, the starting symbol position of the uplink data channel is selected from the configurable range, and is notified to a receiving end.

An embodiment of the present disclosure further provides a method for feeding back a time parameter (terminal side). The method includes steps 201, 202 and 203.

In step 201, N value sets configured for a first type parameter set are determined, where N is an integer greater than or equal to 1, and the value of N is agreed by a transceiving end or is determined according to signaling configured by a base station.

In step 202, a demand of uplink data sending preparation time corresponding to the N value sets is determined.

In step 203, indication information of the demand of the uplink data sending preparation time corresponding to the N value sets is fed back.

The limitation on the configuration of the transmission parameter includes steps described below.

An embodiment of the present disclosure provides a method for configuring an uplink parameter (base station side). The method includes steps 111, 112 and 113.

In step 111, a starting symbol position of an uplink data channel is determined.

In step 112, a configurable range of a first type parameter set is determined according to the starting symbol position of the uplink data channel.

The first type parameter set includes one or more of the following parameters: a transmission block size, a code block size, a layer number, a DMRS port number, a modulation and coding parameter, a Numerology parameter, a maximum DCI number, a total OFDM symbol number occupied by PUSCH, and a DCI location.

In step 113, a configuration of the first type parameter set is selected from the configurable range, and is notified to a receiving end.

An embodiment of the present disclosure further provides a method for feeding back configuration restriction information (terminal side). The method includes steps 211, 212 and 213.

In step 211, M values of uplink data sending preparation time are determined, where M is an integer greater than or equal to 1, and a value of M is agreed by a transceiving end or is determined according to signaling configured by a base station.

In step 212, a restriction configuration range of a first type parameter set corresponding to the M values of the uplink data sending preparation time is determined.

In step 213, indication information of the restriction configuration range of the first type parameter set corresponding to the M values of the uplink data sending preparation time is fed back.

Figure 18:
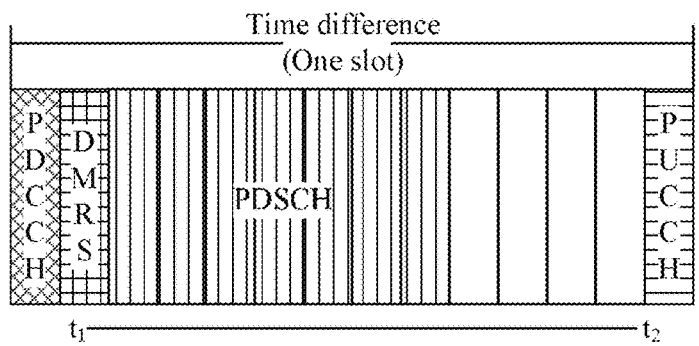
FIG. 18 is a schematic diagram one of time of downlink data demodulation and response information preparation according to an embodiment of the present disclosure.
Figure 19:
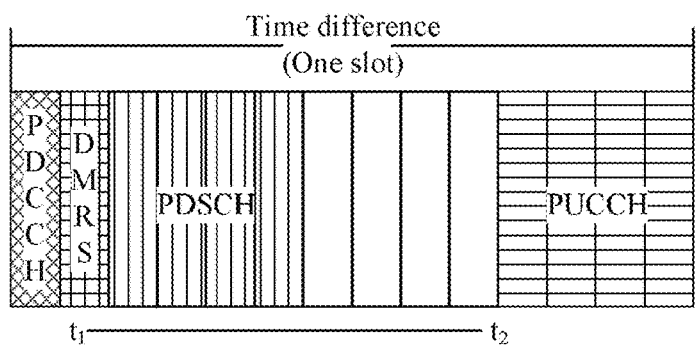
FIG. 19 is a schematic diagram two of time of downlink data demodulation and response information preparation according to an embodiment of the present disclosure.

DL Data Processing:

The time difference between t1 and t2 in FIGS. 18 and 19 is the maximum time for downlink data demodulation and response information preparation, where t1 and t2 are time positions, which can be called the DL data processing. It is to be noted that the DCI position sent in the PDCCH is not necessarily on a first symbol, but may be on a second or a third symbol, which reduces the time difference between t1 and t2. The PUCCH has two types: long format and short format. The number of occupied symbols may be one or more, and the starting position may also be moved forward or backward.

Factors that affect DL Data processing time demands include at least one of the following:

1. mapping parameter: if one CB is mapped on multiple symbols, since the decoding is performed only after all information is received, longer processing time is needed;
2. transmission block size/code block size: which represents the size of a TB or the size of a CB; one TB includes one or more CBs;
3. available RE number: which represents the number of available REs; the greater the RE number, the greater the number of modulation symbols needed to be transmitted will be, and the more complex the processing will be, and the available REs may be counted from a signal carrier frequency or from multiple carrier frequencies;
4. layer number or DMRS port number: which represents the transmission layer number; multiple layers may be used for simultaneous transmission when the degree of freedom of spatial multiplexing is high enough, each layer transmits a different number, and since more data is needed to be processed and some complex layer mapping processing may be added, the greater the layer number, the more complex the receiving processing will be; the DMRS port number is usually the same as the layer number, and in some cases, the DMRS port number is a multiple of the layer number; the DMRS channel estimation also needs processing time;
5. modulation/coding parameter: the modulation mode used in the existing wireless communication system mainly include BPSK modulation, QPSK modulation, 16 QAM, 64 QAM, 256 QAM and the like, and different modulation modes have different constellation maps and also have different complexities; the coding technology currently has LDPC code, turbo code, CC code, polar code and other manners, and different types of decoding have different complexities, for example, the complexity of the LDPC decoding is less than the complexity of the turbo code; there are also multiple code rates, such as ⅓, ½, ¼, ¾, ⅚ and the like, and in a condition with the same input bit, the lower the code rate, the more complex the decoding will be;
6. Numerology parameter: which mainly includes a subcarrier number/interval, an FFT point number, a time domain symbol (e.g., an OFDM symbol) length, a sampling frequency and other parameters; the complexity corresponding to different parameters is also different;
7. DCI format type/size: different DCI format types or different DCI format sizes have different detection complexities; since the demodulation of the downlink data is started only after the DCI is successfully detected, the more time spent on the DCI detection, the less time left for demodulation and decoding and uplink response feedback;
8. MIMO scheme: the transmission technology includes multiple technologies, such as SFBC/STBC of diversity transmission, CCD technology, and precoder cycling; these technologies have different receiving complexities and different processing time;
9. maximum DCI number: the terminal may receive multiple DCI, and needs more processing time if it receives multiple DCI; multiple DCI includes multiple DCI of one cyclic prefix (CC) or multiple DCI of multiple CCs;
10. PDSCH symbol number: an ending position of the symbol number occupied by the downlink of the terminal will affect the processing time left for the terminal;
11. transmission number: newly-transmitted data transmitted for the first time is generally processed quickly, but the retransmission needs to be jointly decoded with previously transmitted information, and the more the retransmission number, the more complex the processing, and the more time is needed;
12. UE category: different types of UEs have different capability levels, and need different time when processing the same service;
13. precoding parameter: different precoding manners have different complexities, for example, the linear precoding and the non-linear precoding have different complexities, and the multiuse precoding and the single-user precoding have different complexities; in addition, when there is the multilevel precoding, the more the precoding levels, the higher the dimension and the more complex the processing; different precoding granularities have different complexities, such as sub-band precoding and broadband precoding;
14. timing advance (TA): this parameter is used for sending advance of the terminal to overcome some problems caused by different arrival time caused by different transmission paths of different UEs; the bigger the TA, the shorter available processing time for the UE; and
15. waveform: the waveform has SC-FDMA and OFDM, different waveforms have different signal processing manners on the baseband, for example, the SC-FDMA has one more transformation than the OFDM, which also causes different complexities.

The enhancement of the flexibility of the processing time includes the following content.

An embodiment of the present disclosure further provides a method for configuring a position parameter (terminal side). The method includes steps 301, 302 and 303.

In step 301, a configuration value of a second type parameter set is determined.

The second type parameter set includes one or more combinations of the following parameters: a transmission block size, a code block size, an available RE number, a layer number, a DMRS number, a modulation parameter, a coding parameter, a Numerology parameter, a DCI format type/size, a maximum DCI number, a symbol number occupied by a PUSCH, a User category, a DCI location, a waveform, a transmission number, a precoding parameter, a mapping manner, and a timing advance.

In step 302, a configurable range of an ending symbol position of a downlink data channel and/or a configurable range of an uplink response information time domain sending symbol are determined.

The ending symbol position of the downlink data channel in the configurable range is not less than a j-th time domain symbol, where j denotes a symbol index, and a value of j is determined according to one or more parameters in the second type parameter set.

Optionally, the uplink response information time domain sending symbol position in the configurable range is not less than a k-th time domain symbol, where k denotes a symbol index, and a value of k is determined according to one or more parameters in the second type parameter set.

Optionally, an interval between the ending symbol position of the downlink data channel and the uplink response information time domain sending symbol position in the configurable range is not less than m symbols, where m is an integer greater than 1, and a value of m is determined according to one or more parameters in the second type parameter set.

In step 303, the ending symbol position of the downlink data channel and/or the uplink response information time domain sending symbol position are selected from the configurable range, and are notifies to a receiving end.

Figure 20:
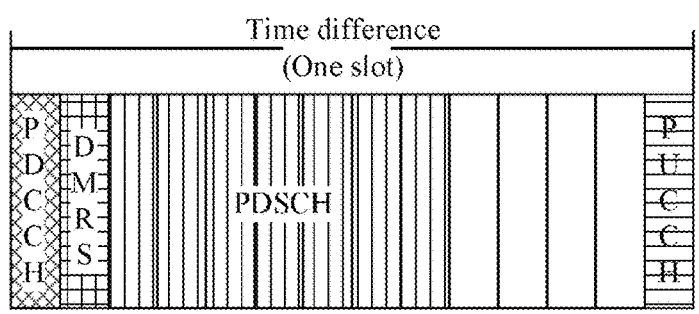
FIG. 20 is a schematic diagram one of a method for determining a response message sending configuration according to an embodiment of the present disclosure.
Figure 21:
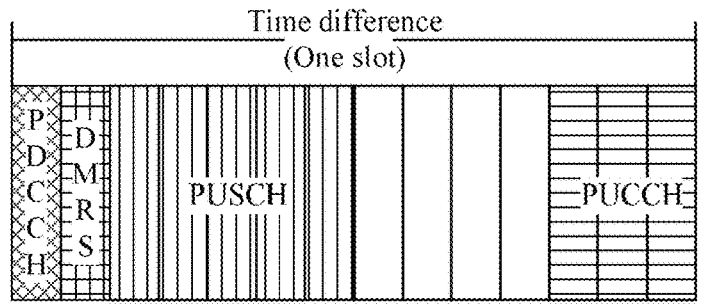
FIG. 21 is a schematic diagram two of a method for determining a response message sending configuration according to an embodiment of the present disclosure.

An embodiment of the present disclosure further provides a method for determining a response message sending configuration (base station or terminal). The method includes steps a, b and c and its principle is as shown in FIGS. 20 and 21.

In step a, a configuration of a second type parameter set is determined.

In step b, a transmission (sending or receiving) configuration of a response message is determined according to the configuration of the second type parameter set, where the transmission configuration of the response message includes: a transmission position of the response message, a response message number, and a type of a channel carrying the response message.

In step c, the sending or receiving is performed according to the determined transmission configuration of the response message.

An embodiment of the present disclosure further provides a method for feeding back configuration restriction information (terminal side). The method includes steps described below.

An embodiment of the present disclosure further provides a method for feeding back a time parameter (terminal side). The method includes steps described below.

In step 401, N value sets configured for a second type parameter set are determined, where N is an integer greater than or equal to 1, and the value of N is agreed by a transceiving end or is determined according to signaling configured by a base station.

The second type parameter set includes one or more combinations of the following parameters: a transmission block size, a code block size, an available RE number, a layer number, a DMRS number, a modulation parameter, a coding parameter, a Numerology parameter, a DCI format type/size, a maximum DCI number, a symbol number occupied by a PUSCH, a User category, a DCI location, a waveform, a transmission number, a precoding parameter, and a mapping manner.

In step 402, a demand of downlink data processing time corresponding to the N value sets is determined.

In step 403, indication information of the demand of the downlink data processing time corresponding to the N value sets is fed back.

The limitation on the configuration of the transmission parameter is as follows.

An embodiment of the present disclosure provides a method for configuring an uplink parameter (base station side). The method includes steps 311, 312 and 313.

In step 311, an ending symbol position of a downlink data channel is determined.

In step 312, a configurable range of a second type parameter set is determined according to the ending symbol position of the downlink data channel.

In step 313, a configuration of the second type parameter set is selected from the configurable range, and is notified to a receiving end.

An embodiment of the present disclosure further provides a method for feeding back configuration restriction information (terminal side). The method includes steps 411, 412 and 413.

In step 411, M values of downlink data processing time are determined, where M is an integer greater than or equal to 1, and a value of M is agreed by a transceiving end or is determined according to signaling configured by a base station.

In step 412, a restriction configuration range of a second type parameter set corresponding to the M values of the downlink data processing time is determined.

In step 413, indication information of the restriction configuration range of the second type parameter set corresponding to the M values of the downlink data processing time is fed back.

CSI Processing:

The DCI transmitted in the PDCCH is used for triggering feedback of the CSI, and the calculation of the CSI involves two parts, that is, channel measurement and interference measurement. The channel measurement mainly uses the CSI-RS, and may also use other types of RSs. The interference measurement mainly uses the IMR. The CSI-RS/IMR may be triggered by the DCI, or has been already configured before the DCI is sent.

Figure 22:
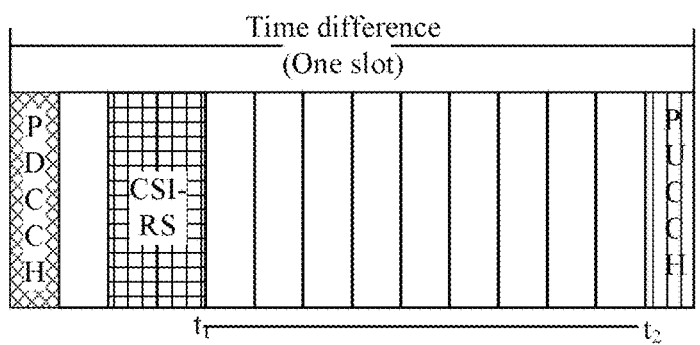
FIG. 22 is a schematic diagram one of time of downlink data demodulation and response information preparation according to an embodiment of the present disclosure.
Figure 23:
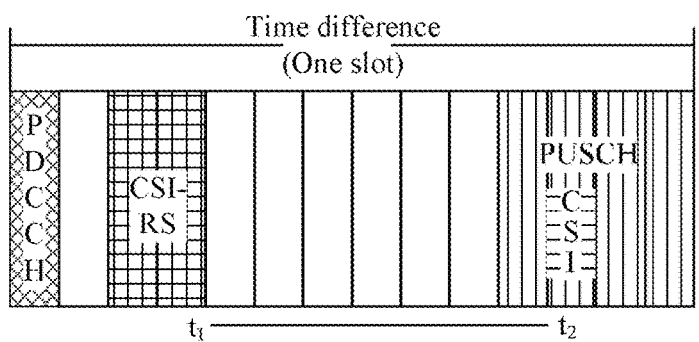
FIG. 23 is a schematic diagram two of time of downlink data demodulation and response information preparation according to an embodiment of the present disclosure.

If the position of the CSI-RS or the IMR is after the DCI, the time difference between t1 and t2 in FIGS. 22 and 23 is the maximum time for downlink data demodulation and response information preparation, which can be called the DL Data processing. The CSI can be fed back in the PUCCH, and the PUCCH has two types: long format and short format. The number of occupied symbols may be one or more, and the starting position may also be moved forward or backward. The CSI can also be fed back in a resource area allocated by the PUSCH, and the occupied position can be flexible.

Figure 24:
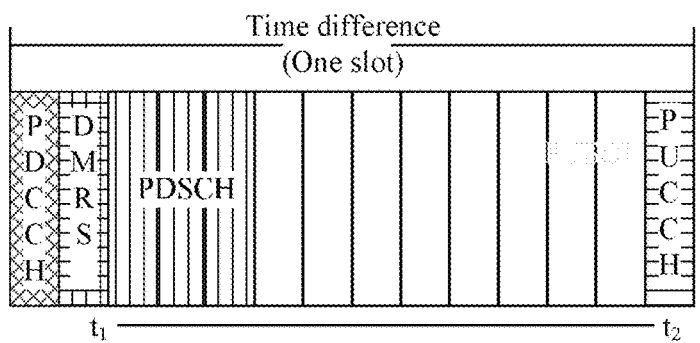
FIG. 24 is a schematic diagram one of CSI measurement according to an embodiment of the present disclosure.
Figure 25:
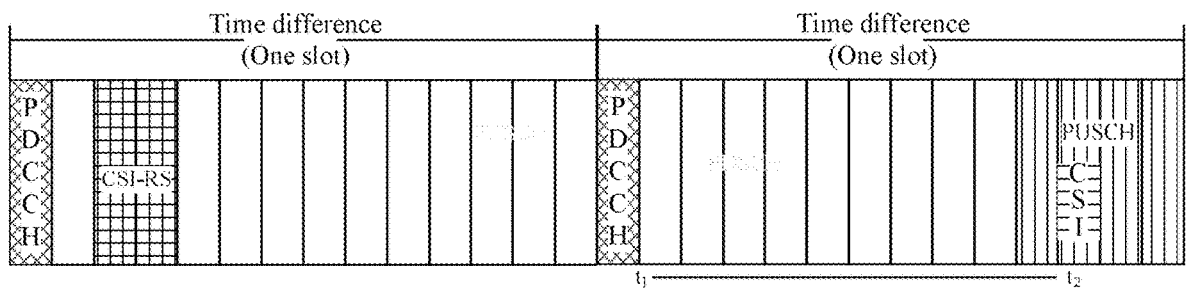
FIG. 25 is a schematic diagram two of CSI measurement according to an embodiment of the present disclosure.

In addition, besides the CSI-RS measurement channel, if the PDSCH transmission exists, the CSI can also be measured by using the DMRS of the PDSCH, as shown in FIGS. 24 and 25.

Besides the case that the position of the CSI-RS or the IMR is located in the slot, the position of the CSI-RS or the IMR may also be sent before the slot triggers the DCI. There is an example below.

In a case, the processing time is the time from the reception of an indication instructing the CSI in the PDCCH to trigger the DCI to the reporting of the CSI, but since the position of the CSI-RS or the IMR has been sent previously, a part of coarse CSI quantization can be performed in advance, and when subsequent sub-frames are triggered by the CSI, the processing is performed. The whole process will be faster.

Factors that affect DL Data processing time demands include at least one of the following:

1. RS setting: which includes the position configuration, and needs the CSI to calculate different positions of the reference RS, which leaves different processing time for the CSI calculation; which also includes the number of ports of the RS, where the more the number of ports, the longer the needed processing time;
2. IMR setting: which includes the position setting, and needs the CSI to calculate different positions of the reference IMR, which leaves different processing time for the CSI calculation;
3. measurement or reporting setting: which includes:
   a. feedback mode configuration: such as sub-band feedback/broadband feedback, where the complicity of the sub-band feedback is higher;
   b. feedback granularity: the bigger the feedback granularity, the more complex the feedback granularity, and the required processing time is different;
   c. quantization manner: which includes various types of quantization manners, such as codebook feedback or non-codebook feedback, explicit quantization or implicit quantization, and low-precision quantization or high-precision quantization, which respectively have different complexities and thus have different processing time demands;
   d. quantized broadband size/RB number: the bigger the broadband or the more RBs, the more complex the measurement feedback;
   e. codebook configuration: the greater the number of codewords in the codebook, the more cases needed to be traversed in the quantization and the higher the complexity; the larger the dimension of the codebook, the higher the complexity of the quantization;
   f. transmission assumption of the CSI calculator: different transmission technologies can be assumed to feed back the optimal CSI, such as assumption diversity, precoding pooling, beam scanning and the like; different transmission technologies have different complexities, and thus the complexity when the CSI is quantized is also different;
4. maximum DCI number: the terminal may receive multiple DCI, and needs more processing time if it receives multiple DCI; multiple DCI includes multiple DCI of one cyclic prefix (CC) or multiple DCI of multiple CCs; and
5. UE category: different types of UEs have different capability levels, and need different time when processing the same service.

The enhancement of the flexibility of the processing time is as follows.

An embodiment of the present disclosure provides a method for determining a CSI transmission position (base station side). The method includes steps 501 and 502.

In step 501, a configuration value of a third type parameter set is determined.

The third type parameter set includes one or more combinations of the following parameters: a measurement reference signal position, an IMR position, a port number, a feedback mode configuration, a feedback granularity, a quantization manner, a quantized bandwidth size or an RB number, a codebook configuration, a transmission assumption of a CSI calculator, and a timing advance.

In step 502, a transmission position and/or a slot position of a time domain sending symbol of uplink report CSI are determined according to the configuration of the third type parameter set.

An embodiment of the present disclosure further provides a method for feeding back configuration restriction information (terminal side). The method includes the following.

An embodiment of the present disclosure further provides a method for feeding back a time parameter (terminal side). The method includes steps 601, 602 and 603.

In step 601, N value sets configured for a third type parameter set are determined, where N is an integer greater than or equal to 1, and the value of N is agreed by a transceiving end or is determined according to signaling configured by a base station.

The third type parameter set includes one or more combinations of the following parameters: a reference signal position, an IMR position, a port number, a feedback mode configuration, a feedback granularity, a quantization manner, a quantized bandwidth size or an RB number, a codebook configuration, and a transmission assumption of a CSI calculator.

In step 602, a demand of CSI calculation processing time corresponding to the N value sets is determined.

In step 603, indication information of the demand of the CSI calculation processing time corresponding to the N value sets is fed back.

The limitation on the reference signal position of the CSI is as follows.

An embodiment of the present disclosure provides a method for configuring an uplink parameter (base station side). The method includes steps 511, 512 and 513.

In step 511, a reporting time domain position of CSI is determined.

In step 512, a configurable range of a third type parameter set is determined according to the reporting time domain position of the CSI.

The third type parameter set includes one or more combinations of the following parameters: a reference signal position of CSI calculation, an IMR position, a port number, a feedback mode configuration, a feedback granularity, a quantization manner, a quantized bandwidth size or an RB number, a codebook configuration, a transmission assumption of a CSI calculator, a time domain position of a reference signal for CSI measurement, and a time domain position of an IMR for CSI measurement.

In step 513, a configuration of a second type parameter set is selected from the configurable range, and is notified to a receiving end.

An embodiment of the present disclosure further provides a method for feeding back configuration restriction information (terminal side). The method includes steps 611, 612 and 613.

In step 611, M values of CSI calculation time are determined, where M is an integer greater than or equal to 1, and a value of M is agreed by a transceiving end or is determined according to signaling configured by a base station.

In step 612, a restriction configuration range of a third type parameter set corresponding to the M values of the downlink CSI calculation time is determined.

In step 613, indication information of the restriction configuration range of the third type parameter set corresponding to the M values of the downlink CSI calculation time is fed back.

Application in the a Non Self-Contained Structure:

In the non self-contained structure, since the sending of downlink signaling and feedback of corresponding response cannot be completed within a basic time interval, the corresponding content to be reported which is triggered by the DCI needs to be fed back in the subsequent basic time interval.

Figure 26:
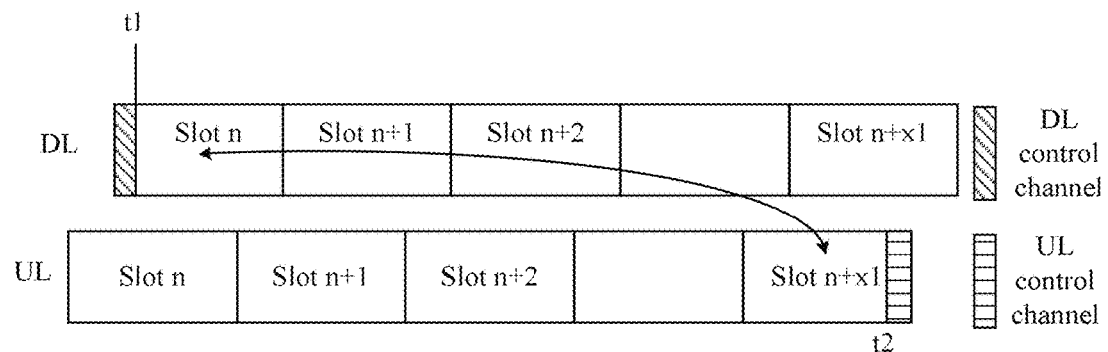
FIG. 26 is a schematic diagram one of a TDD system or a flexible duplex system according to an embodiment of the present disclosure.
Figure 27:
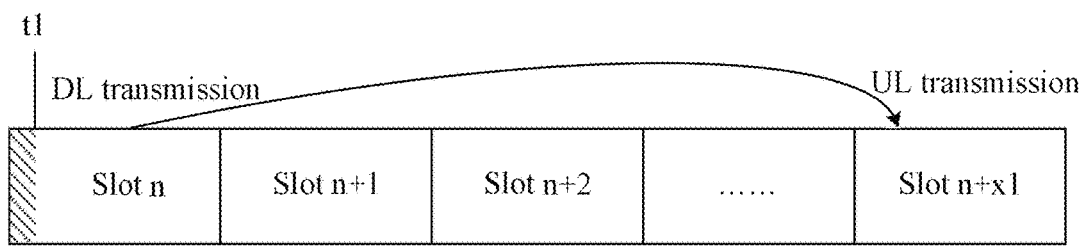
FIG. 27 is a schematic diagram two of a TDD system or a flexible duplex system according to an embodiment of the present disclosure.

The FDD system and the TDD system/the flexible duplex system are respectively shown in FIGS. 26 and 27.

For example, the DCI is sent on an n-th slot, and the corresponding content to be reported is fed back on an n+x1-th slot.

Figure 28:
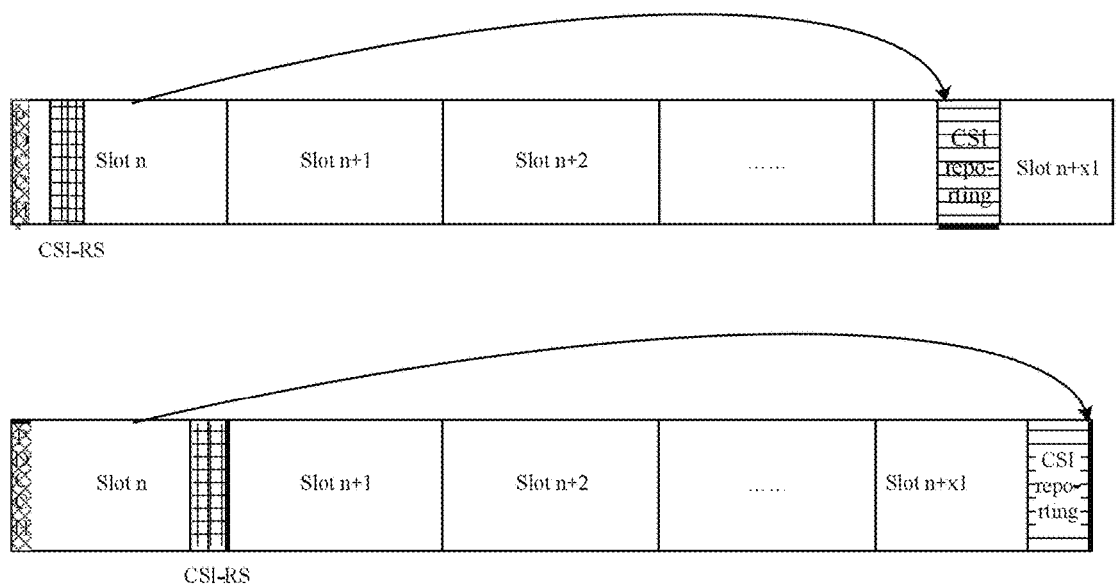
FIG. 28 is a schematic diagram one of a sending position of a CSI-RS according to an embodiment of the present disclosure.

For example, in the following manner, the sending position of the CSI-RS may be forward or backward in one slot; if the minimum interval demand is more than four slots, and if the CSI-RS is sent on the n-th slot and its position is forward, its corresponding feedback may be uploaded on an n+4-th slot, the CSI reporting position is transmitted on the fourth slot, and the specific time domain symbol position may be forward or backward. If the CSI-RS is sent on the n-th slot and its position is backward, its corresponding feedback may be uploaded on the n+4-th slot, and the CSI reporting position may only be backward in the fourth slot; otherwise, the processing time will be insufficient, as shown in FIG. 28.

Figure 29:
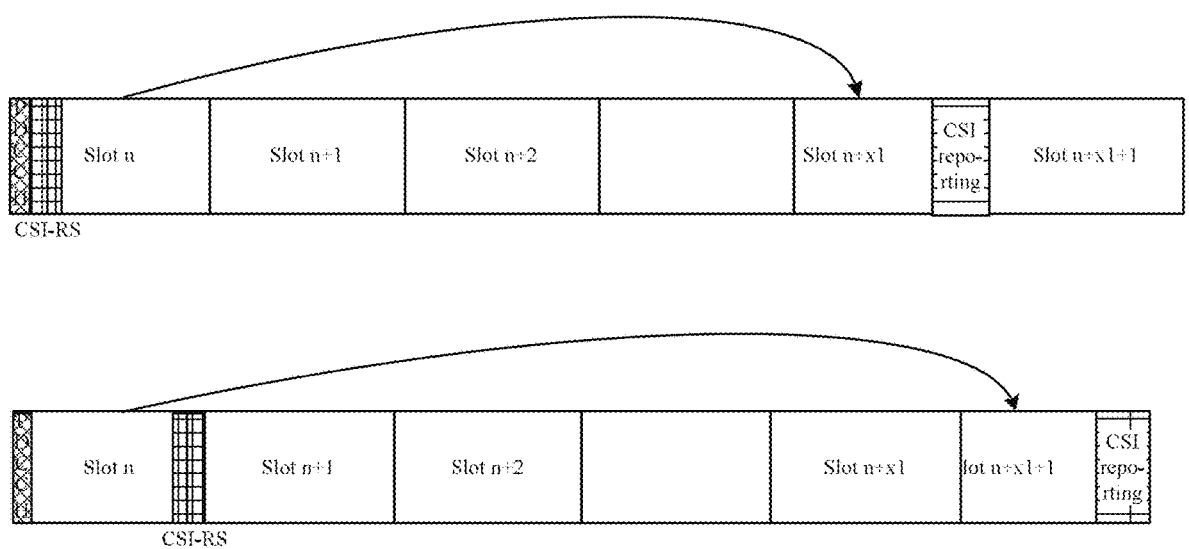
FIG. 29 is a schematic diagram two of a sending position of a CSI-RS according to an embodiment of the present disclosure.

In another example, in the following manner, the sending position of the CSI-RS may be forward or backward in one slot; if the minimum interval demand is more than 4.5 slots, and if the CSI-RS is sent on the n-th slot and its position is forward, its corresponding feedback may be uploaded on the n+4-th slot, and the position is backward. If the CSI-RS is sent on the n-th slot and its position is backward, its corresponding feedback needs to be uploaded on an n+5-th slot; otherwise, the processing time will be insufficient, as shown in FIG. 29.

In the above examples, the time unit involved in these examples is, but is not limited to, the time domain symbol. The time interval between the control information and the reported content triggered by the control information is not limited to one slot, and may also be a time interval in the unit of slot. There is a case in which the time domain symbol in the above examples may be replaced by the slot and may be represented by other time domain units. Since the slot is also a time unit and has a conversion relationship with symbols, for example, one slot is equal to 7 time domain symbols, 14 time domain symbols or the like, the slot is pre-agreed or is configured by the base station.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

An embodiment further provides a device for configuring a starting symbol position of an uplink data channel. The device is configured to implement the above-mentioned embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 30:
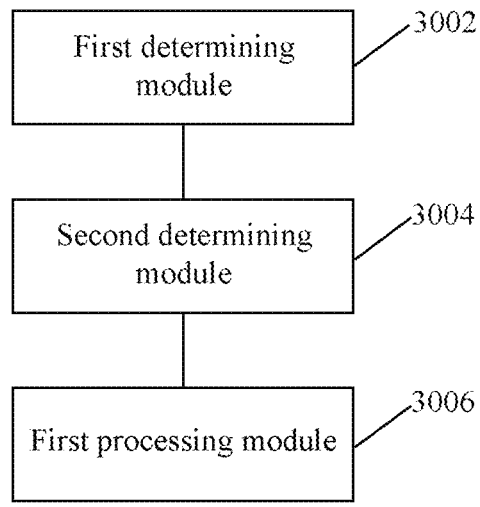
FIG. 30 is a block diagram of a device for configuring a starting symbol position of an uplink data channel according to an embodiment of the present disclosure.

FIG. 30 is a block diagram of a device for configuring a starting symbol position of an uplink data channel according to an embodiment of the present disclosure. As shown in FIG. 30, the device includes a first determining module 3002, a second determining module 3004 and a first processing module 3006. The device is described in detail below.

The first determining module 3002 is configured to determine a configuration value of a first type parameter set, where the first type parameter set is a set of uplink data parameters. The second determining module 3004 is connected to the above first determining module 3002 and is configured to determine a configuration range of the starting symbol position of the uplink data channel according to the configuration value of the first type parameter set. The first processing module 3006 is connected to the above second determining module 3004 and is configured to select the starting symbol position of the uplink data channel from the configuration range of the starting symbol position of the uplink data channel, and notify a receiving end of the selected starting symbol position of the uplink data channel.

In an optional embodiment, the first type parameter set includes at least one of: a transmission block size or a code block size, an available RE number, a transmission layer number, a modulation parameter or a coding parameter, a Numerology parameter, a DCI format type or size, a transmission technology, a maximum DCI number, a symbol number occupied by a PUSCH, a User category, a DCI location, a waveform, or a timing advance. In the embodiment, the above User category is used for distinguishing user capability levels.

In an optional embodiment, the symbol position in the configuration range is not less than an i-th time domain symbol, where i denotes a time domain symbol index, and a value range of i is determined according to at least one of transmission parameters included in the first type parameter set.

Figure 31:
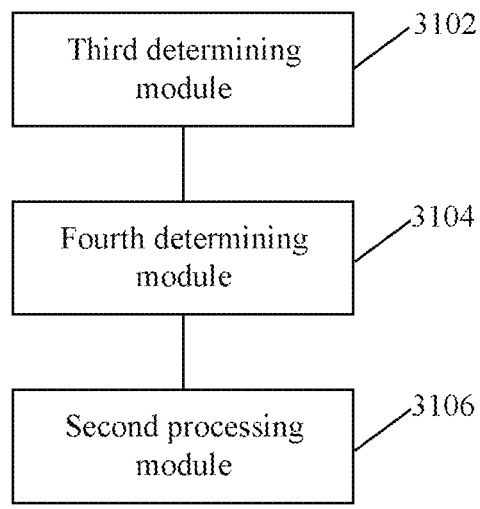
FIG. 31 is a block diagram of a device for configuring an uplink parameter according to an embodiment of the present disclosure.

FIG. 31 is a block diagram of a device for configuring an uplink parameter according to an embodiment of the present disclosure. As shown in FIG. 31, the device includes a third determining module 3102, a fourth determining module 3104 and a second processing module 3106. The device is described in detail below.

The third determining module 3102 is configured to determine a starting symbol position of an uplink data channel. The fourth determining module 3104 is connected to the above third determining module 3102 and is configured to determine a configuration range of a first type parameter set according to the starting symbol position of the uplink data channel, where the first type parameter set is a set of uplink data parameters. The second processing module 3106 is connected to the above fourth determining module 3104 and is configured to select a configuration of the first type parameter set in the configuration range of the first type parameter set, and notify a receiving end of the configuration of the first type parameter set.

In an optional embodiment, the first type parameter set includes at least one of: a transmission block size, a code block size, an available RE number, a transmission layer number, a modulation parameter or a coding parameter, a Numerology parameter, a maximum DCI number, a symbol number occupied by a PUSCH, or a DCI location.

Figure 32:
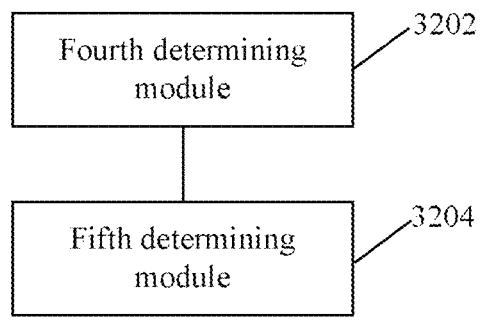
FIG. 32 is a block diagram of a device for configuring a position parameter according to an embodiment of the present disclosure.

FIG. 32 is a block diagram of a device for configuring a position parameter according to an embodiment of the present disclosure. As shown in FIG. 32, the device includes a fourth determining module 3202 and a fifth determining module 3204. The device is described in detail below.

The fourth determining module 3202 is configured to determine a configuration value of a second type parameter set, where the second type parameter set is a set of downlink data parameters. The fifth determining module 3204 is connected to the above fourth determining module 3202 and is configured to determine a configuration range of an ending symbol position of a downlink data channel and/or a configuration range of a time domain sending symbol position of uplink response information according to the configuration value of the second type parameter set.

In an optional embodiment, the second type parameter set includes at least one of: a transmission block size, a code block size, an available RE number, a transmission layer number, a modulation parameter, a coding parameter, a Numerology parameter, a DCI format type or size, a maximum DCI number, a symbol number occupied by a PUSCH, a User category, a DCI location, a waveform, a transmission number, a precoding parameter, a mapping manner, or a timing advance.

In an optional embodiment, the device further includes a third processing module. The third processing module is configured to select the ending symbol position of the downlink data channel in the configuration range of the ending symbol position of the downlink data channel, and notify a receiving end of the selected ending symbol position of the downlink data channel.

In an optional embodiment, the ending symbol position of the downlink data channel in the configuration range includes one of: the ending symbol position of the downlink data channel in the configuration range is not greater than a j-th time domain symbol, where j denotes a time domain symbol index, and a value range of j is determined according to at least one of transmission parameters included in the second type parameter set.

In an optional embodiment, the ending symbol position of the downlink data channel in the configuration range includes one of: the time domain sending symbol position of the uplink response information in the configuration range is not less than a k-th time domain symbol, where k denotes a time domain symbol index, and a value range of j is determined according to at least one of transmission parameters included in the second type parameter set.

In an optional embodiment, the ending symbol position of the downlink data channel and the time domain sending symbol position of the uplink response information include: an interval between the ending symbol position of the downlink data channel and the time domain sending symbol position of the uplink response information in the configuration range is not less than m symbols, where m is an integer greater than 1, and a value of m is determined according to at least one of transmission parameters included in the second type parameter set.

Figure 33:
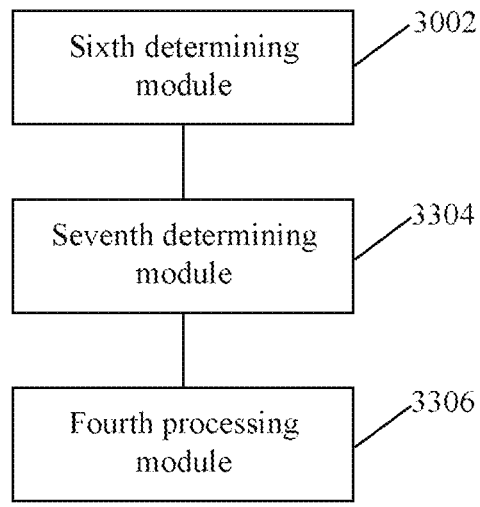
FIG. 33 is a block diagram of a device for configuring a downlink parameter according to an embodiment of the present disclosure.

FIG. 33 is a block diagram of a device for configuring a downlink parameter according to an embodiment of the present disclosure. As shown in FIG. 33, the device includes a sixth determining module 3302, a seventh determining module 3304 and a fourth processing module 3306. The device is described in detail below.

The sixth determining module 3302 is configured to determine an ending symbol position of a downlink data channel. The seventh determining module 3304 is connected to the above sixth determining module 3302 and is configured to determine a configuration range of a second type parameter set according to the ending symbol position of the downlink data channel, where the second type parameter set is a set of downlink data parameters. The fourth processing module 3306 is connected to the above seventh determining module 3304 and is configured to select a configuration of the second type parameter set in the configuration range of the second type parameter set, and notify a receiving end of the configuration of the second type parameter set.

Figure 34:
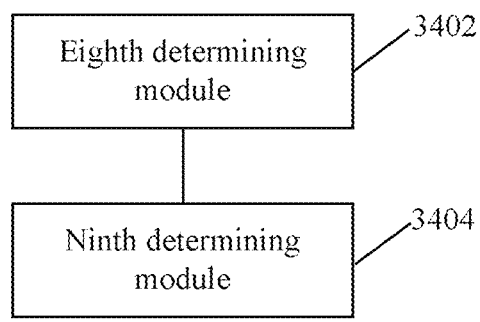
FIG. 34 is a block diagram of a device for determining a transmission position of channel state information according to an embodiment of the present disclosure.

FIG. 34 is a block diagram of a device for determining a transmission position of channel state information according to an embodiment of the present disclosure. As shown in FIG. 34, the device includes an eighth determining module 3402 and a ninth determining module 3404. The device is described in detail below.

The eighth determining module 3402 is configured to determine a configuration value of a third type parameter set, where the configuration value of the third type parameter set is a set of parameters of CSI. The ninth determining module 3404 is connected to the above eighth determining module 3402 and is configured to determine a transmission position and/or a slot position of a time domain sending symbol of uplink report CSI according to the configuration value of the third type parameter set.

In an optional embodiment, the third type parameter set includes at least one of: a measurement reference signal position, an IMR position, a port number, a feedback mode configuration, a feedback granularity, a quantization manner, a quantized bandwidth size or an RB number, a codebook configuration, a transmission assumption of a CSI calculator, or a timing advance.

Figure 35:
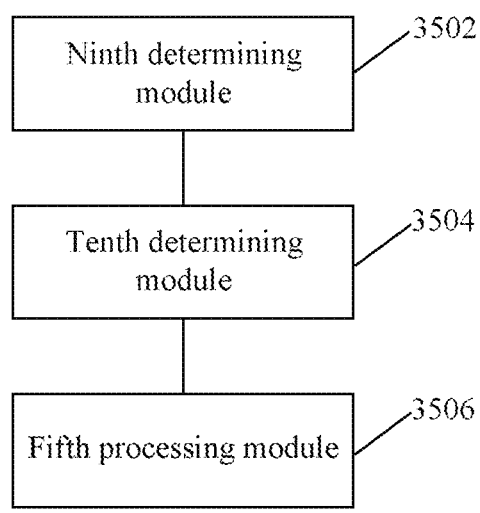
FIG. 35 is a block diagram of a device for configuring channel state information according to an embodiment of the present disclosure.

FIG. 35 is a block diagram of a device for configuring channel state information according to an embodiment of the present disclosure. As shown in FIG. 35, the device includes a ninth determining module 3502, a tenth determining module 3504 and a fifth processing module 3506. The device is described in detail below.

The ninth determining module 3502 is configured to determine a reporting time domain position of CSI. The tenth determining module 3504 is connected to the above ninth determining module 3502 and is configured to determine a configuration range of a third type parameter set according to the reporting time domain position of the CSI, where a configuration value of the third type parameter set is a set of parameters of the CSI. The fifth processing module 3506 is connected to the above tenth determining module 3504 and is configured to select a configuration of the third type parameter set in the configuration range of the third type parameter set, and notify a receiving end of the determined configuration of the third type parameter set.

Figure 36:
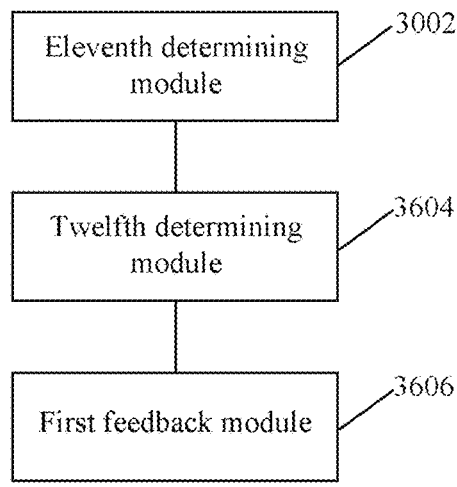
FIG. 36 is a block diagram one of a device for feeding back a time parameter according to an embodiment of the present disclosure.

FIG. 36 is a block diagram of a device for feeding back a time parameter according to an embodiment of the present disclosure. As shown in FIG. 36, the device includes an eleventh determining module 3602, a twelfth determining module 3604 and a first feedback module 3606. The device is described in detail below.

The eleventh determining module 3602 is configured to determine $N_1$ value sets configured for a first type parameter set, where $N_1$ is an integer greater than or equal to 1, and a value of $N_1$ is agreed by a receiving end and a sending end or is determined according to signaling configured by a base station. The twelfth determining module 3604 is connected to the above eleventh determining module 3602 and is configured to determine a demand of uplink data sending preparation time corresponding to the $N_1$ value sets. The first feedback module 3606 is connected to the above twelfth determining module 3604 and is configured to feed back indication information of the demand of the uplink data sending preparation time corresponding to the $N_1$ value sets.

In an optional embodiment, the third type parameter set includes at least one of: an IMR position, a port number, a feedback mode configuration, a feedback granularity, a quantization manner, a quantized bandwidth size or an RB number, a codebook configuration, a transmission assumption of a CSI calculator, a time domain position of a reference signal for uplink report CSI measurement, or a time domain position of an IMR for uplink report CSI measurement.

Figure 37:
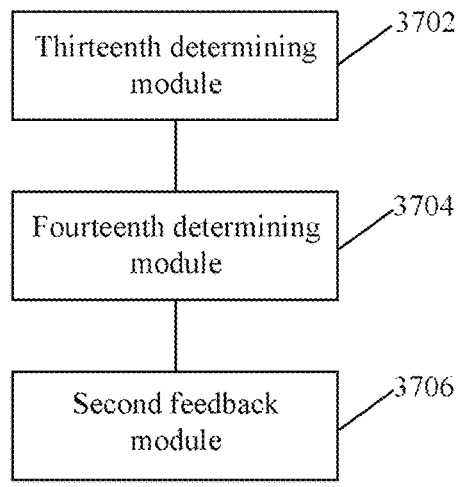
FIG. 37 is a block diagram one of a device for feeding back configuration restriction information according to an embodiment of the present disclosure.

FIG. 37 is a block diagram of a device for feeding back configuration restriction information according to an embodiment of the present disclosure. As shown in FIG. 37, the device includes a thirteenth determining module 3702, a fourteenth determining module 3704 and a second feedback module 3706. The device is described in detail below.

The thirteenth determining module 3702 is configured to determine $M_1$ values of uplink data sending preparation time, where $M_1$ is an integer greater than or equal to 1, and a value of $M_1$ is agreed by a receiving end and a sending end or is determined according to signaling configured by a base station. The fourteenth determining module 3704 is connected to the above thirteenth determining module 3702 and is configured to determine a restriction configuration range of a first type parameter set corresponding to the $M_1$ values of the uplink data sending preparation time, where the first type parameter set is a set of uplink data parameters. The second feedback module 3706 is connected to the above fourteenth determining module 3704 and is configured to feed back indication information of the restriction configuration range of the first type parameter set corresponding to the $M_1$ values of the uplink data sending preparation time.

Figure 38:
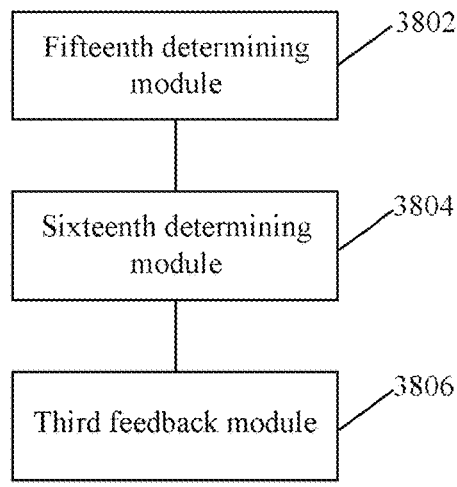
FIG. 38 is a block diagram two of a device for feeding back a time parameter according to an embodiment of the present disclosure.

FIG. 38 is a block diagram of a device for feeding back a time parameter according to an embodiment of the present disclosure. As shown in FIG. 38, the device includes a fifteenth determining module 3802, a sixteenth determining module 3804 and a third feedback module 3806. The device is described in detail below.

The fifteenth determining module 3802 is configured to determine $N_2$ value sets configured for a second type parameter set, where $N_2$ is an integer greater than or equal to 1, a value of $N_2$ is agreed by a receiving end and a sending end or is determined according to signaling configured by a base station, and the second type parameter set is a set of downlink data parameters. The sixteenth determining module 3804 is connected to the above fifteenth determining module 3802 and is configured to determine a demand of downlink data processing time corresponding to the $N_2$ value sets. The third feedback module 3806 is connected to the above sixteenth determining module 3804 and is configured to feed back indication information of the demand of the downlink data processing time corresponding to the $N_2$ value sets.

In an optional embodiment, the second type parameter set includes at least one of: a transmission block size, a code block size, an available RE number, a layer number, a DMRS number, a modulation parameter, a coding parameter, a Numerology parameter, a DCI format type or size, a maximum DCI number, a symbol number occupied by a PUSCH, a User category, a DCI location, a waveform, a transmission number, a precoding parameter, or a mapping manner.

Figure 39:
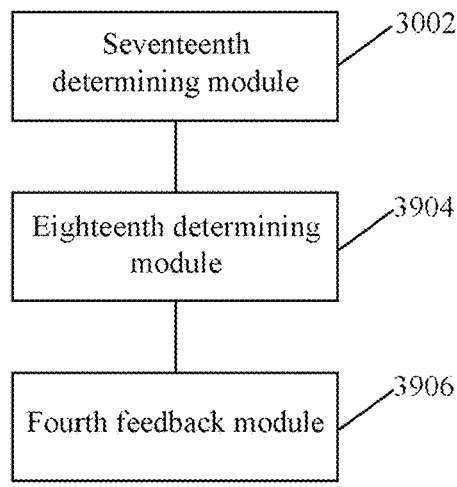
FIG. 39 is a block diagram two of a device for feeding back configuration restriction information according to an embodiment of the present disclosure.

FIG. 39 is a block diagram of a device for feeding back configuration restriction information according to an embodiment of the present disclosure. As shown in FIG. 39, the device includes a seventeenth determining module 3902, an eighteenth determining module 3904 and a fourth feedback module 3906. The device is described in detail below.

The seventeenth determining module 3902 is configured to determine $M_2$ values of downlink data processing time, where $M_2$ is an integer greater than or equal to 1, and a value of $M_2$ is agreed by a receiving end and a sending end or is determined according to signaling configured by a base station. The eighteenth determining module 3904 is connected to the above seventeenth determining module 3902 and is configured to determine a restriction configuration range of a second type parameter set corresponding to the $M_2$ values of the downlink data processing time, where the second type parameter set is a set of downlink data parameters. The fourth feedback module 3906 is connected to the above eighteenth determining module 3904 and is configured to feed back indication information of the restriction configuration range of the second type parameter set corresponding to the $M_2$ values of the downlink data processing time.

Figure 40:
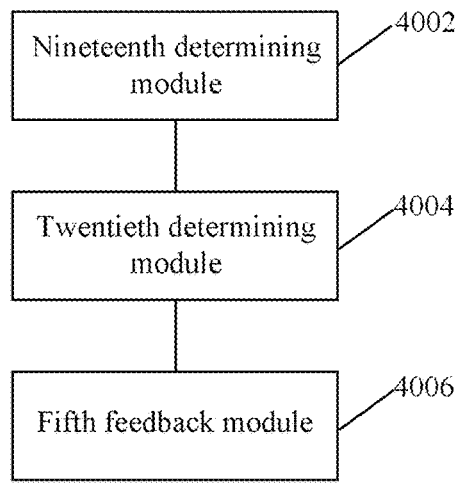
FIG. 40 is a block diagram three of a device for feeding back a time parameter according to an embodiment of the present disclosure.

FIG. 40 is a block diagram of a device for feeding back a time parameter according to an embodiment of the present disclosure. As shown in FIG. 40, the device includes a nineteenth determining module 4002, a twentieth determining module 4004 and a fifth feedback module 4006. The device is described in detail below.

The nineteenth determining module 4002 is configured to determine $N_3$ value sets configured for a third type parameter set, where $N_3$ is an integer greater than or equal to 1, a value of $N_3$ is agreed by a receiving end and a sending end or is determined according to signaling configured by a base station, and the third type parameter set is a set of parameters of CSI. The twentieth determining module 4004 is connected to the above nineteenth determining module 4002 and is configured to determine a demand of CSI calculation processing time corresponding to the $N_3$ value sets. The fifth feedback module 4006 is connected to the above twentieth determining module 4004 and is configured to feed back indication information of the demand of the CSI calculation processing time corresponding to the $N_3$ value sets.

In an optional embodiment, the third type parameter set includes at least one of: a reference signal position, an IMR position, a port number, a feedback mode configuration, a feedback granularity, a quantization manner, a quantized bandwidth size or an RB number, a codebook configuration, or a transmission assumption of a CSI calculator.

Figure 41:
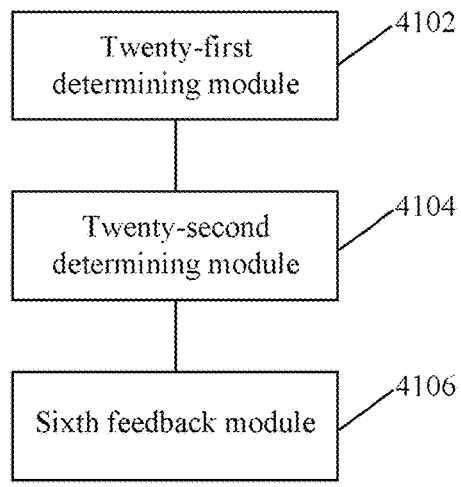
FIG. 41 is a block diagram three of a device for feeding back configuration restriction information according to an embodiment of the present disclosure.

FIG. 41 is a block diagram of a device for feeding back configuration restriction information according to an embodiment of the present disclosure. As shown in FIG. 41, the device includes a twenty-first determining module 4102, a twenty-second determining module 4104 and a sixth feedback module 4106. The device is described in detail below.

The twenty-first determining module 4102 is configured to determine $M_3$ values of CSI calculation time, where $M_3$ is an integer greater than or equal to 1, and a value of $M_3$ is agreed by a receiving end and a sending end or is determined according to signaling configured by a base station. The twenty-second determining module 4104 is connected to the above twenty-first determining module 4102 and is configured to determine a restriction configuration range of a third type parameter set corresponding to the $M_3$ values of the CSI calculation time. The sixth feedback module 4106 is connected to the above twenty-second determining module 4104 and is configured to feed back indication information of the restriction configuration range of the third type parameter set corresponding to the $M_3$ values of the CSI calculation time.

Figure 42:
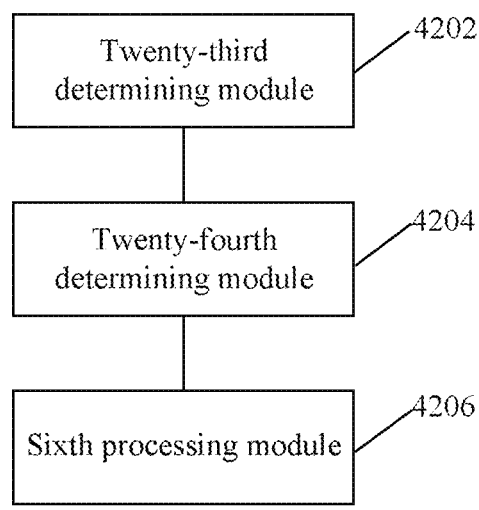
FIG. 42 is a block diagram of a device for processing a transmission parameter according to an embodiment of the present disclosure.

FIG. 42 is a block diagram of a device for processing a transmission parameter according to an embodiment of the present disclosure. As shown in FIG. 42, the device includes a twenty-third determining module 4202, a twenty-fourth determining module 4204 and a sixth processing module 4206. The device is described in detail below.

The twenty-third determining module 4202 is configured to determine a configuration of a transmission parameter set of a data channel. The twenty-fourth determining module 4204 is connected to the above twenty-third determining module 4202 and is configured to determine a transmission configuration of a response message according to the configuration of the transmission parameter set of the data channel, where the transmission configuration of the response message includes: a transmission position of the response message, and a type of a channel carrying the response message. The sixth processing module 4206 is connected to the twenty-fourth determining module 4204 and is configured to send or receive data according to the transmission configuration of the response message.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

An embodiment of the present disclosure further provides a storage medium. The storage medium includes stored programs which, when executed, execute the method of any one of the embodiments described above.

In one embodiment, in this embodiment, the storage medium may be configured to store program codes for executing steps described below.

In an embodiment, the storage medium in this embodiment may include, but is not limited to, a USB flash disk, a ROM, a RAM, a mobile hard disk, a magnetic disk, an optical disk or another medium capable of storing the program codes.

The embodiment of the present disclosure further provides a processor. The processor is configured to execute programs which, when executed, perform the steps in the method of any one of the above-mentioned embodiments.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

The invention claimed is:

1. A method for configuring a starting symbol position of an uplink data channel, comprising:
   determining a configuration value of a transmission parameter in a first type parameter set, wherein the first type parameter set is a set of uplink transmission parameters;
   determining the starting symbol position of the uplink data channel in a configuration range according to the configuration value of the transmission parameter;
   selecting the starting symbol position of the uplink data channel from the configuration range of the starting symbol position of the uplink data channel; and
   notifying a receiving end of the starting symbol position of the uplink data channel,
   wherein the first type parameter set comprises at least one of:
   a downlink control information (DCI) format type or size;
   a maximum DCI number;
   a symbol number occupied by a physical uplink shared channel; or
   a transmission waveform.

2. The method of claim 1, wherein the first type parameter set further comprises at least one of:
   a transmission block size or a code block size;

an available resource element (RE) number;
a transmission layer number;
a modulation parameter or a coding parameter; or
a transmission technology.

3. The method of claim 1, wherein the starting symbol position in the configuration range is not less than an i-th time domain symbol, wherein i denotes a time domain symbol index, and a value of i is determined according to at least one of transmission parameters in the first type parameter set.

4. A device for configuring a starting symbol position of an uplink data channel, comprising a memory and a processor being configured to:
    determine a configuration value of a transmission parameter in a first type parameter set, wherein the first type parameter set is a set of uplink data parameters;
    determine the starting symbol position of the uplink data channel in a configuration range according to the configuration value of the transmission parameter;
    select the starting symbol position of the uplink data channel from the configuration range of the starting symbol position of the uplink data channel; and
    notify a receiving end of the starting symbol position of the uplink data channel,
    wherein the first type parameter set comprises at least one of:
    a downlink control information (DCI) format type or size;
    a maximum DCI number;
    a symbol number occupied by a physical uplink shared channel; or
    a transmission waveform.

5. The device of claim 4, wherein the first type parameter set comprises at least one of:
    a transmission block size or a code block size;
    an available resource element (RE) number;
    a transmission layer number;
    a modulation parameter or a coding parameter; or
    a transmission technology.

6. The device of claim 4, wherein the starting symbol position in the configuration range is not less than an i-th time domain symbol, wherein i denotes a time domain symbol index, and a value of i is determined according to at least one of transmission parameters in the first type parameter set.

7. A method, performed by a mobile terminal, for configuring a starting symbol position of an uplink data channel, comprising:
    receiving a notification from a base station, wherein the notification indicates the starting symbol position of the uplink data channel;
    determining the starting symbol position of the uplink data channel is in a configuration range based on a configuration value of a transmission parameter in a first type parameter set, wherein the first type parameter set is a set of uplink transmission parameters; and
    transmitting the uplink data channel from the starting symbol position to the base station, wherein the first type parameter set comprises at least one of:
    a downlink control information (DCI) format type or size;
    a maximum DCI number;
    a symbol number occupied by a physical uplink shared channel; or
    a transmission waveform.

8. The method of claim 7, wherein the first type parameter set comprises at least one of:
    a transmission block size or a code block size;
    an available resource element (RE) number;
    a transmission layer number;
    a modulation parameter or a coding parameter; or
    a transmission technology.

9. The method of claim 7, wherein the starting symbol position in the configuration range is not less than an i-th time domain symbol, wherein i denotes a time domain symbol index, and a value of i is determined according to at least one of transmission parameters in the first type parameter set.

10. A mobile terminal comprising:
    a transmission device configured to receive a notification from a base station, wherein the notification indicates a starting symbol position of an uplink data channel; and
    a processor configured to determine the starting symbol position of the uplink data channel is in a configuration range based on a configuration value of a transmission parameter in a first type parameter set, wherein the first type parameter set is a set of uplink transmission parameters;
    wherein the transmission device is further configured to transmit the uplink data channel from the starting symbol position to the base station,
    wherein the first type parameter set comprises at least one of:
    a downlink control information (DCI) format type or size;
    a maximum DCI number;
    a symbol number occupied by a physical uplink shared channel; or
    a transmission waveform.

11. The mobile terminal of claim 10, wherein the first type parameter set comprises at least one of:
    a transmission block size or a code block size;
    an available resource element (RE) number;
    a transmission layer number;
    a modulation parameter or a coding parameter; or
    a transmission technology.

12. The mobile terminal of claim 10, wherein the starting symbol position in the configuration range is not less than an i-th time domain symbol, wherein i denotes a time domain symbol index, and a value of i is determined according to at least one of transmission parameters in the first type parameter set.

* * * * *